US008417252B2

(12) United States Patent
Palanki et al.

(10) Patent No.: US 8,417,252 B2
(45) Date of Patent: Apr. 9, 2013

(54) METHOD AND APPARATUS FOR INTERFERENCE REPORTING IN A N-MIMO COMMUNICATION SYSTEM

(75) Inventors: Ravi Palanki, San Diego, CA (US);
Alexei Y. Gorokhov, San Diego, CA (US); Naga Bhushan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 636 days.

(21) Appl. No.: 12/580,139

(22) Filed: Oct. 15, 2009

(65) Prior Publication Data

US 2010/0106828 A1 Apr. 29, 2010

Related U.S. Application Data

(60) Provisional application No. 61/108,278, filed on Oct. 24, 2008, provisional application No. 61/162,613, filed on Mar. 23, 2009.

(51) Int. Cl.
*H04W 72/00* (2009.01)

(52) U.S. Cl. ......... 455/450; 370/329; 370/328; 370/334

(58) Field of Classification Search ............... 455/67.11, 455/522, 450, 452.11, 422.1; 370/328, 329, 370/332, 334, 335
See application file for complete search history.

(56) References Cited

U.S. PATENT DOCUMENTS

| | | | | |
|---|---|---|---|---|
| 6,307,849 | B1 * | 10/2001 | Tiedemann, Jr. | 370/335 |
| 6,393,277 | B1 * | 5/2002 | Sahin et al. | 455/423 |
| 2004/0166886 | A1 * | 8/2004 | Laroia et al. | 455/522 |
| 2005/0163194 | A1 * | 7/2005 | Gore et al. | 375/132 |
| 2008/0268833 | A1 * | 10/2008 | Huang et al. | 455/425 |

FOREIGN PATENT DOCUMENTS

| | | |
|---|---|---|
| JP | 2006014047 A | 1/2006 |
| JP | 2006128853 A | 5/2006 |
| JP | 2007520164 A | 7/2007 |
| JP | 2006524966 T | 5/2011 |
| WO | 2005074155 | 8/2005 |

OTHER PUBLICATIONS

International Search Report and Written Opinion—PCT/US2009/061723, International Search Authority—European Patent Office—Oct. 15, 2010.

* cited by examiner

*Primary Examiner* — Nay A Maung
*Assistant Examiner* — Angelica Perez
(74) *Attorney, Agent, or Firm* — Steven A. Raney

(57) ABSTRACT

Systems and methodologies are described herein that facilitate interference measurement and reporting in a network multiple-in-multiple-out (N-MIMO) communication system. As described herein, a network device can measure and report interference corresponding to network nodes outside a designated set of nodes that can cooperatively serve the device. Respective interference reports can additionally identify dominant interfering nodes, correlation between transmit antennas of respective nodes, or the like. Subsequently, respective interference reports can be combined with per-node channel information to manage coordination and scheduling across respective network nodes. As further described herein, interference from a network node can be measured by observing reference and/or synchronization signals from the network node. To aid such observation, respective non-interfering network nodes can define null pilot intervals in which transmission is silenced or otherwise reduced. As additionally described herein, loading information broadcasted by respective interfering network nodes can be identified and utilized in connection with interference calculation.

55 Claims, 15 Drawing Sheets

METHOD AND APPARATUS FOR INTERFERENCE REPORTING IN A N-MIMO COMMUNICATION SYSTEM

CROSS-REFERENCE

This application claims the benefit of U.S. Provisional Application Ser. No. 61/108,278, filed Oct. 24, 2008, and entitled "INTERFERENCE REPORTING FOR N-MIMO SYSTEMS," and U.S. Provisional Application Ser. No. 61/162,613, filed Mar. 23, 2009, and entitled "INTERFERENCE REPORTING FOR N-MIMO SYSTEMS." The foregoing applications are incorporated herein by reference in their entireties.

BACKGROUND

I. Field

The present disclosure relates generally to wireless communications, and more specifically to techniques for supporting coordinated communication across network nodes in a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices. In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the network of a mobile operator via a Digital Subscriber Line (DSL) router, cable modem, or the like.

Wireless communication systems can be configured to include a series of wireless access points, which can provide coverage for respective locations within the system. Such a network structure is generally referred to as a cellular network structure, and access points and/or the locations they respectively serve in the network are generally referred to as cells.

Further, in a multiple-in-multiple-out (MIMO) communication system, multiple sources and/or destinations (e.g., corresponding to respective antennas) can be utilized for the transmission and reception of data, control signaling, and/or other information between devices in the communication system. The use of multiple sources and/or destinations for respective transmissions in connection with a MIMO communication system has been shown to yield higher data rates, improved signal quality, and other such benefits over single-input and/or single-output communication systems in some cases. One example of a MIMO communication system is a Network MIMO (N-MIMO) or Coordinated Multipoint (CoMP) system, in which a plurality of network nodes can cooperate to exchange information with one or more receiving devices, such as user equipment units (UEs) or the like.

Coordination between network nodes in a N-MIMO communication system can be conducted according to one or more coordination strategies based on various network parameters, parameters relating to a user device for which coordination is to be conducted, and/or other suitable factors. Accordingly, it would be desirable to implement techniques for generating and processing feedback reports corresponding to interference and/or other network parameters in order to improve system performance gains associated with multi-node coordination in a N-MIMO communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a set of network cells operable to conduct communication with inter-site coordination; measuring an amount of received power from respective network cells not associated with the identified set of network cells; and reporting a measured amount of received power to one or more network cells in the identified set of network cells.

A second aspect described herein relates to a wireless communications apparatus, which can comprise a memory that stores data relating to a set of serving network nodes operable to conduct communication with inter-node coordination. The wireless communications apparatus can further comprise a processor configured to measure an amount of received power from respective network nodes not associated with the set of serving network nodes and to report a measured amount of received power to one or more serving network nodes.

A third aspect relates to an apparatus, which can comprise means for identifying a set of associated network nodes operable to perform at least one of uplink communication or downlink communication using inter-node coordination and means for reporting an amount of received power corresponding to respective network nodes not associated with the set of associated network nodes.

A fourth aspect relates to a computer program product, which can comprise a computer-readable medium that comprises code for causing a computer to identify a set of associated network nodes operable to perform at least one of uplink communication or downlink communication using inter-node coordination and code for causing a computer to report an amount of received power corresponding to respective network nodes not associated with the set of associated network nodes.

A fifth aspect described herein relates to a method, which can comprise defining an interference reporting schedule for one or more associated user equipment units (UEs); scheduling respective null pilot intervals within the interference reporting schedule; and conducting limited transmission upon occurrence of a scheduled null pilot interval within the interference reporting schedule.

A sixth aspect described herein relates to a wireless communications apparatus, which can comprise a memory that stores data relating to one or more user devices and an interference reporting schedule associated with the one or more user devices. The wireless communications apparatus can further comprise a processor configured to define respective null pilot intervals within the interference reporting schedule such that limiting is performed for communication occurring substantially simultaneously with the respective null pilot intervals.

A seventh aspect relates to an apparatus, which can comprise means for defining an interference reporting schedule for respective associated user devices, wherein the interference reporting schedule includes one or more null pilots and means for performing at least one of transmit silencing or transmit power backoff upon occurrence of respective null pilots in the interference reporting schedule.

An eighth aspect relates to a computer program product, which can comprise a computer-readable medium that comprises code for causing a computer to define an interference reporting schedule for respective associated UEs, wherein the interference reporting schedule includes one or more null pilots, and code for causing a computer to conduct at least one of transmit silencing or transmit power backoff upon occurrence of respective null pilots in the interference reporting schedule.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
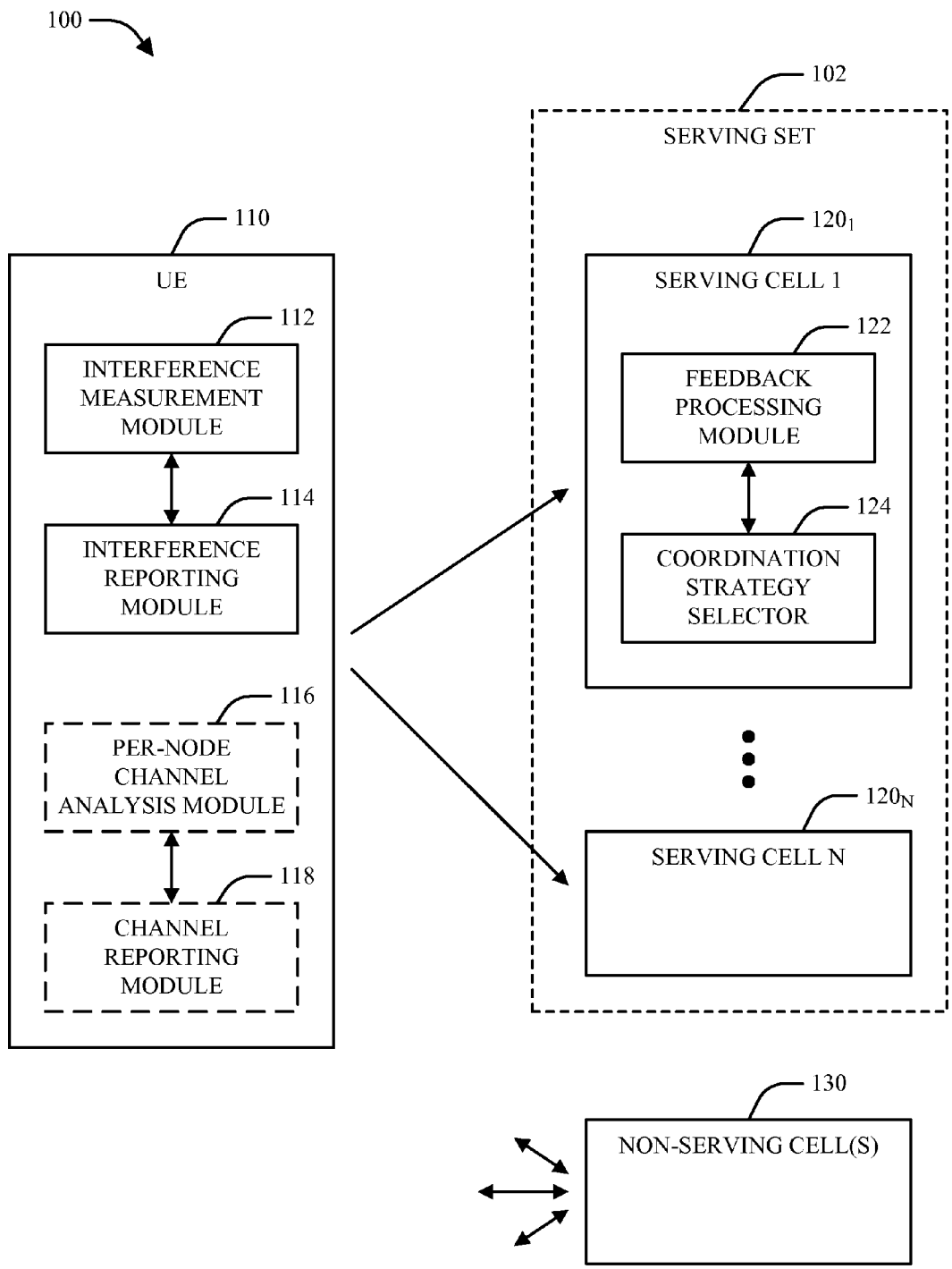
FIG. 1 is a block diagram of a system for feedback generation and reporting in a N-MIMO communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for feedback generation and reporting in a network multi-in-multi-out (Network MIMO or N-MIMO) communication system in accordance with various aspects. As illustrated in FIG. 1, system 100 can include a UE 110, which can communicate with one or more serving cells 120 and/or other suitable network nodes associated with a "serving set" 102 for UE 110. For example, UE 110 can conduct one or more uplink (UL, also referred to as reverse link (RL)) communications to respective serving cells 120, and serving cell(s) 120 can conduct one or more downlink (DL, also referred to as forward link (FL)) communications to UE 110.

In one example, serving set 102 can include all network nodes that can potentially be utilized to serve UE 110. While all such network cells are labeled as "serving cells" 120 in system 100, it should be appreciated that UE 110 can communication with all serving cells 120, a subset of less than all serving cells 120, or no serving cells 120 at any given time. In addition, system 100 can include one or more non-serving cells 130 that do not provide service for UE 110. In one example, respective serving cells 120 and/or non-serving cells 130 can correspond to and/or provide communication coverage for any suitable coverage area(s), such as an area associated with a macro cell, a femto cell (e.g., an access point base station or Home Node B (HNB)), and/or any other suitable coverage area.

In accordance with one aspect, system 100 can utilize one or more N-MIMO, coordinated multipoint (CoMP), and/or other techniques by which a single UE 110 can communicate with a plurality of disparate serving cells 120. In one example, N-MIMO communication can be conducted on the uplink and/or the downlink using any suitable strategy or combination of strategies for coordination between serving cells 120. Such strategies can include, for example, silencing, frequency reuse, coordinated beamforming (CBF), joint transmission (JT), and/or any other suitable cooperation strategies as described herein and/or as generally known in the art.

In accordance with another aspect, a serving cell 120 can receive various parameters relating to a given UE 110, system 100, other serving cells 120, or the like from a UE 110. Such feedback can be processed by a feedback processing module 122 and/or other appropriate mechanisms at serving cell 120, based on which a coordination strategy selector 124 can determine a coordination strategy to be utilized across serving cells 120 in serving set 102 for communication with UE 110.

In traditional wireless communication systems that utilize a single serving cell for a given UE, a UE can report feedback including a Channel Quality Indicator (CQI). CQI feedback as provided by a UE can be expressed, for example, in terms of a ratio of the signal power from the serving cell associated with the UE to the interfering power from all other cells. Based on this information, a cell in a single serving cell system can be enabled to ascertain an effective indication of the rate that can be achieved for the corresponding UE.

In contrast, however, it can be appreciated that the set of serving cells 120 that contribute to signals observed by a given UE 110 (e.g., as opposed to interference) can in some cases not be predetermined For example, a UE 110 can be served by a single cell or multiple cells as a function of various UE-specific and/or network parameters. In addition, if a serving set 102 is predetermined for a given UE 110, it can further be appreciated that a coordination strategy employed by respective serving cells 120 in the serving set 102 can in some cases change over time (e.g., by utilizing different beam directions at different times and/or in any other manner).

Accordingly, if the UE 110 is not made aware in advance of the composition of serving cells 120 in serving set 102 and/or a coordination strategy to be utilized between such serving cells 120, UE 110 may in some cases be unable to compute its achievable rate. It can be appreciated that this, in turn, can cause respective serving cells 120 for UE 110 to experience difficulties in performing coordination strategy selection. As a result, it can further be appreciated that CQI can in some cases be substantially dependent on scheduling and/or coordination decisions made by respective serving cells 120, thereby rendering a traditional CQI metric insufficient in some cases for coordination strategy selection in a N-MIMO communication.

In accordance with one aspect, a UE 110 can mitigate at least the shortcomings of traditional CQI reporting as noted above by measuring and reporting (e.g., via an interference measurement module 112 and an interference reporting module 114, respectively) a sum or total interference observed from all non-serving cells 130 (e.g., all network cells not in an associated serving set 102). Thus, for example, if UE 110 can potentially be served by one or both of a cell A and a cell B, interference reporting module 114 and/or another suitable mechanism can be utilized by UE 110 to report the received power from all cells excluding cells A and B (e.g., as measured by interference measurement module 112 and/or other suitable mechanisms).

In accordance with another aspect, a serving cell 120 that receives a combined interference report from a UE 110 as provided above can process the feedback via a feedback processing module 122 and/or any other suitable means, based on which a coordination strategy selector 124 can facilitate selection and scheduling of a coordination scheme to be utilized across serving cells 120 for UE 110. For example, based on interference information and/or other suitable information provided by UE 110 relating to achievable channel quality under various coordination schemes, coordination strategy selector 124 can select an appropriate strategy for inter-node cooperation (e.g., inter-site packet sharing, coordinated transmit interference nulling, etc.) and subsequently schedule one or more serving cells 120 for communication with UE 110 pursuant to the selected cooperation strategy.

In accordance with a further aspect, UE 110 can additionally or alternatively include an optional per-node channel analysis module 116 and channel reporting module 118, which can be utilized to respectively measure and report information corresponding to channel conditions corresponding to respective serving cells 120. Thus, for example, channel reporting module 118 can provide feedback to respective serving cells 120 corresponding to the observed strength of downlink channels corresponding to the respective serving cells 120 and/or any other indicator of the quality of downlink channels corresponding to serving cells 120.

In one example, per-node channel information provided by channel reporting module 118 in the above manner can be utilized by a feedback processing module 122 and/or coordination strategy selector 124 at respective serving cells to facilitate further refinement to coordination strategy selection and/or scheduling. For example, coordination strategy selector 124 can identify observed downlink channel strength corresponding to respective serving cells 120 and utilize such information to approximate the potential interference impact of the respective serving cells 120 on communication with an associated UE 110. Accordingly, coordination strategy selector 124 can utilize reported interference and channel information to identify a coordination scheme and a combination of serving cells 120 to be utilized therewith in order to minimize interference observed at UE 110, to maximize overall system throughput, and/or to achieve other appropriate benefits within system 100. By way of a specific illustrative example, upon selecting coordinated beamforming as a cooperation scheme between serving cells 120, coordination strategy selector 124 can determine a channel quality that would result from instructing respective serving cells to form beams away from an associated UE 110 and make scheduling decisions accordingly. In another example, coordination strategy selector 124 can utilize feedback provided by a UE 110 to select a packet size to be utilized for transmission to UE 110 on a given set of resources.

In another example, coordination strategy selector 124 can utilize feedback obtained from a UE 110 to facilitate clustering and/or scheduling of nodes to be utilized for communication with UE 110. For example, based on channel conditions, buffer state, and/or other parameters relating to a UE 110, respective serving cells 120 in a serving set 102 for UE 110 can be clustered or scheduled into a cooperation strategy for serving UE 110. Further, clustering as performed by coordination strategy selector 124 can be made dynamic such that identities of respective serving cells 120 and/or a number of serving cells 120 associated with UE 110 can be modified in real-time based on changing network conditions. Additionally or alternatively, the manner in which respective clustered cells cooperate with respect to a given UE 110 can be dynamically assigned based on continuously monitored network conditions. For example, a serving cell 120 associated with a UE 110 at a given time can be instructed to actively transmit to UE 110, to form beams away from UE 110, to back off a present transmit power (e.g., based on an explicit power back-off request or an implicit request based on a desired amount of interference reduction), and/or to cooperate with respect to UE 110 in any other suitable manner.

Figure 2:
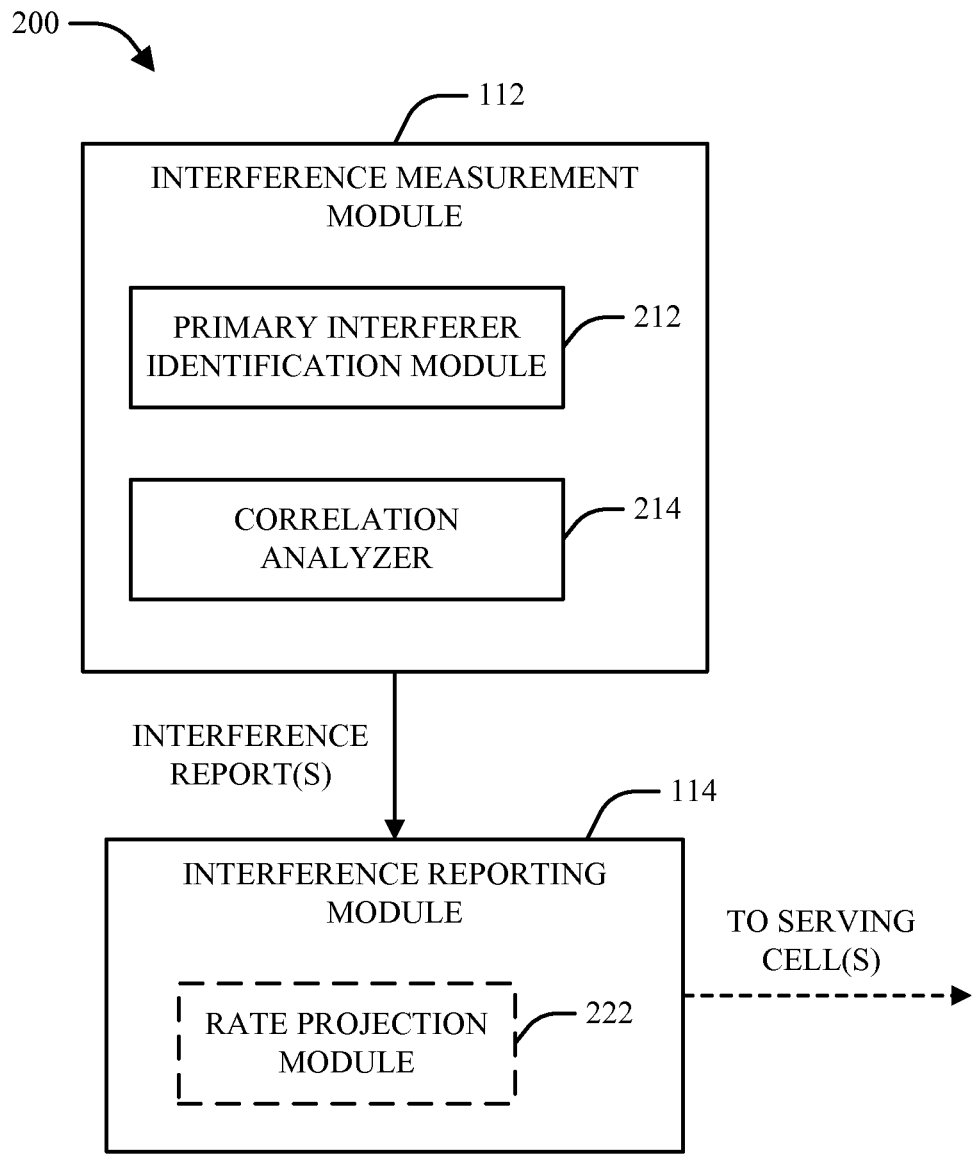
FIG. 2 is a block diagram of a system for performing and reporting measurements relating to interference observed in a distributed wireless communication environment in accordance with various aspects.

Turning now to FIG. 2, a system 200 for performing and reporting measurements relating to interference observed in a distributed wireless communication environment in accordance with various aspects is illustrated. In one example, system 200 can include an interference measurement module 112, which can be employed by a user device (e.g., UE 110) and/or another suitable network device to perform respective interference measurements. Upon generation of interference information by interference measurement module 112, the information can subsequently be reported (e.g., to respective serving cells 120) by an interference reporting module 114.

In accordance with one aspect, interference measurement module 112 can utilize a primary interferer identification module 212 and/or other suitable means to identify one or more network entities from which substantial interference is observed. Upon identification, information relating to observed primary interferers can be provided to interference reporting module 114 for inclusion in a related interference report.

Additionally or alternatively, interference measurement module 112 can include a correlation analyzer 214, which can identify and facilitate reporting of correlation of observed interference. For example, if primary interferer identification module 212 identifies only a single interferer and the interferer is determined to have multiple transmit antennas, correlation analyzer 214 can be utilized to compute the correlation between the transmit antennas of the interferer. In another example, if a device associated with interference measurement module 112 has multiple receive antennas, the device can in some cases be configured to null some or all interference observed from a single interferer. Such receiver interference nulling can be performed, for example, based on a receiver implementation utilized by the device associated with interference measurement module (e.g., minimum mean square error (MMSE), etc.). In accordance with one aspect, interference reporting module 114 can report information relating to analyzed correlations either explicitly or implicitly (e.g., in the form of a rate that can be achieved subsequent to nulling, as determined by an optional rate projection module 222).

In another example, in the event that a given network cell has correlated antennas (e.g., antennas spaced on the order of half of a wavelength) and a channel associated with the cell changes substantially frequently but does not exhibit a significant angular spread, correlation analyzer 214 can measure a long-term coherence matrix corresponding to the channel and facilitate reporting of the coherence matrix to the corresponding cell via interference reporting module 114. Accordingly, if the coherence matrix is, for example, a low-rank matrix, it can be appreciated that a network cell and/or other entity that receives the matrix can facilitate direction of beams to and/or from a device associated with system 200 even in the absence of complete channel information.

In accordance with one aspect, interference estimates made by interference measurement module 112 and reported by interference reporting module 114 can be provided to respective network cells in an explicit or implicit fashion. For example, an implicit interference report can be constructed by an optional rate projection module 222 and/or other suitable means by, for example, estimating a rate that can be achieved when only a given serving cell is transmitting. Further, interference reporting module 114 can provide feedback to respective network cells over a dedicated physical layer channel, using an existing physical layer (e.g., Layer 1 or L1) signaling channel (e.g., a Physical Uplink Control Channel (PUCCH)), via Layer 3 (L3) signaling, and/or in any other suitable manner(s).

Figure 3:
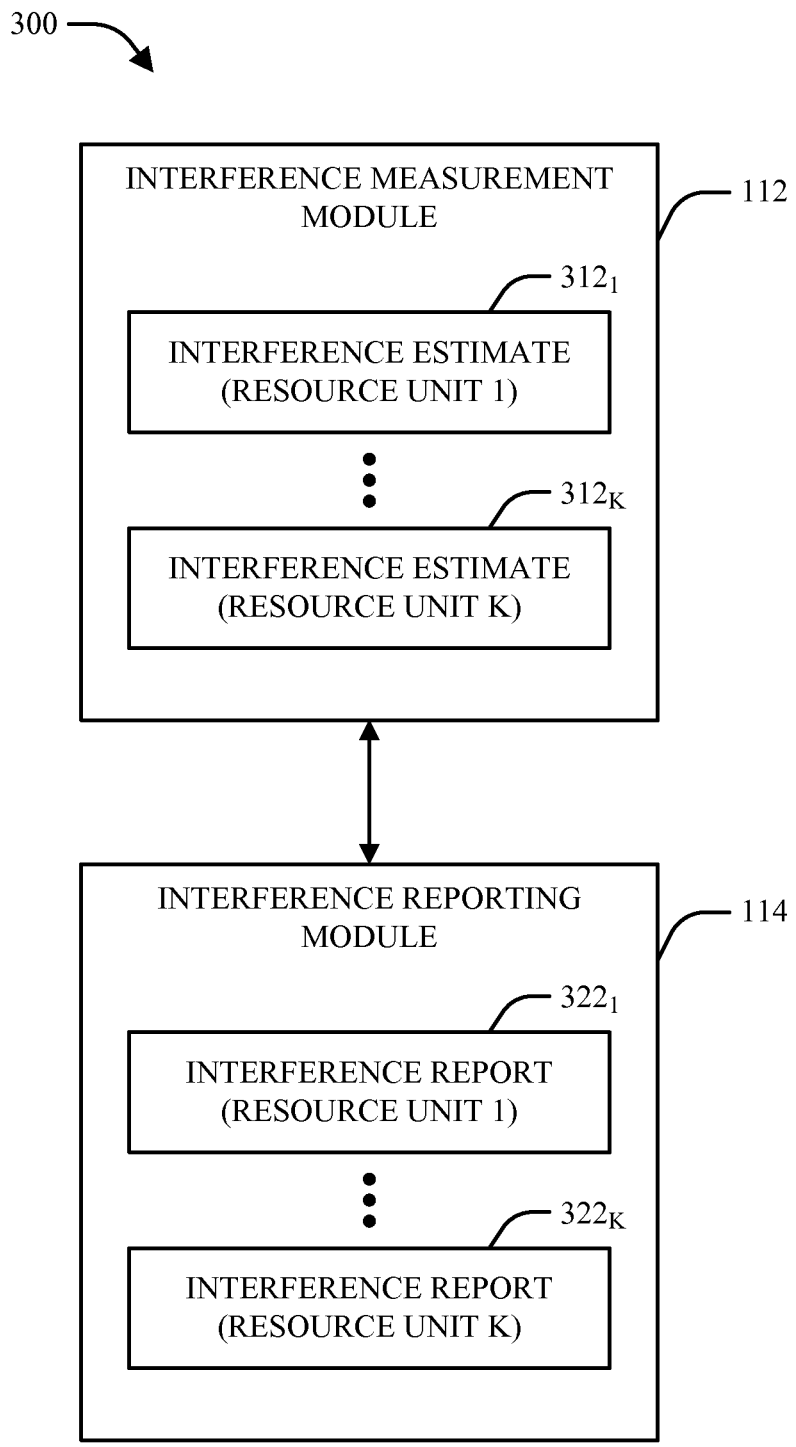
FIG. 3 is a block diagram of a system that facilitates measurement and reporting of interference across a set of resources utilized by an associated wireless communication system in accordance with various aspects.

In accordance with another aspect, interference estimates reported by interference reporting module 114 can correspond to an entire frequency bandwidth designated for an associated communication system, or alternatively interference feedback can be configured to vary on a per-resource unit basis (e.g., from subframe to subframe, sub-band to sub-band, etc.). This is illustrated by diagram 300 in FIG. 3, wherein a set of interference estimates 312 generated by interference measurement module 112 and/or interference reports 322 communicated by interference reporting module 114 can be structured to correspond to a set of K resource units (e.g., subframes, sub-bands, resource blocks, etc.).

Figure 4:
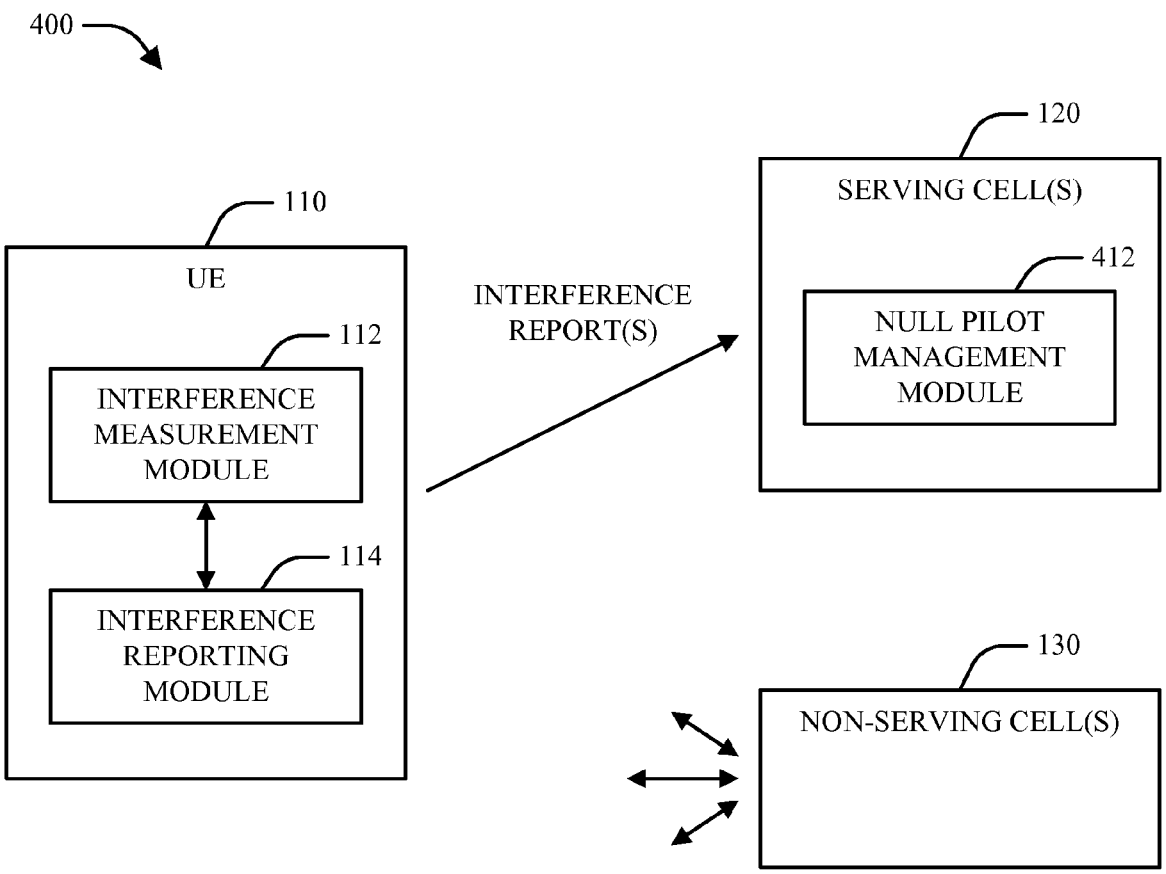
FIGS. 4-5 are block diagrams of respective systems that facilitate observation and measurement of interference by a user device in a wireless communication environment in accordance with various aspects.
Figure 5:
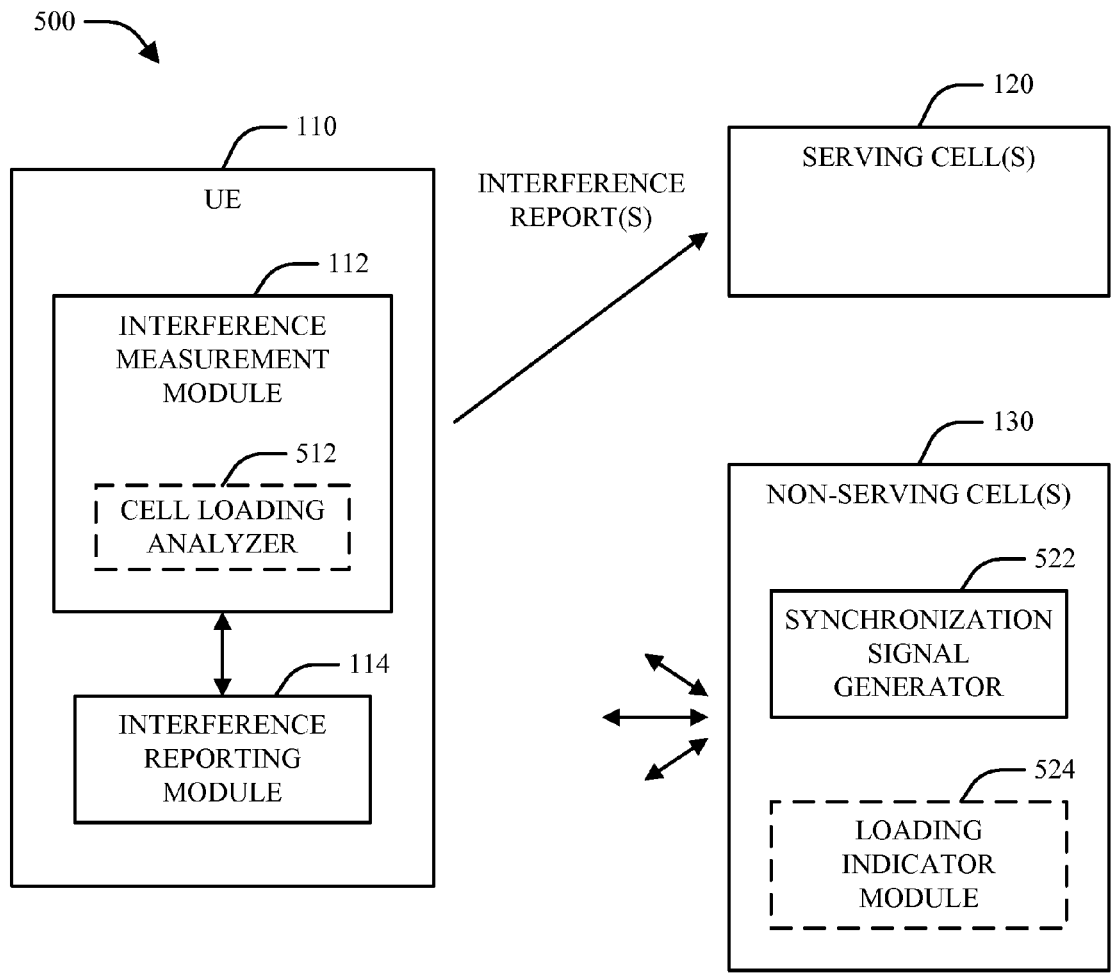

In accordance with a further aspect, interference from respective non-serving cells 130 can be computed by a UE 110 in various manners. Respective examples of techniques that can be conducted by a UE 110 for interference observation and measurement are illustrated by systems 400-500 in FIGS. 4-5. With specific reference first to system 400 in FIG. 4, a serving cell 120 associated with a UE 110 can utilize a null pilot management module 412 and/or any other suitable means to define "null pilot" periods in an associated communication timeline. In one example, null pilot management module 412 can facilitate transmission silencing, transmit power backoff, and/or any other suitable operations at respectively predefined null pilot intervals in time in order to enable an associated UE 110 to observe interfering signals from respective non-serving cells 130 at the predefined null pilot periods with little or no additional signal energy being radiated from an associated serving cell 120.

Additionally or alternatively, an interference measurement module 112 and/or other suitable means at a UE 110 can analyze signal strengths of preambles, reference signals, synchronization signals (e.g., a primary synchronization signal (PSS) and/or secondary synchronization signal (SSS)), and/or other signals broadcasted by respective non-serving cells 130 to compute interference associated with the non-serving cells 130. Thus, as shown by system 500 in FIG. 5, a synchronization signal generator 522 and/or other suitable means at a non-serving cell 130 can be utilized to broadcast one or more reference and/or synchronization signals, based on which UE 110 can estimate interference associated with the non-serving cell 130.

In accordance with another aspect illustrated by system 500, interference measurement module 112 can leverage loading information provided by respective non-serving cells 130 to refine interference estimates corresponding to the non-serving cells 130. In particular, a non-serving cell 130 can include a loading indicator module 524, which can broadcast an indication of the loading of the non-serving cell 130 on a preamble channel (e.g., a Low Reuse Preamble (LRP) channel) and/or another suitable channel, based on which a cell loading analyzer 512 and/or other suitable means at UE 110 can compute a loading-based interference estimate for the non-serving cell 130. In another example, such a loading indication can be provided in a master information block (MIB). provided in one or more associated system information blocks (SIBs), implicitly provided based on the relative phase between a PSS and SSS and/or consecutive PSS and/or SSS instances, and/or provided in any other suitable manner.

In one example, a loading indicator provided by loading indicator module 524 can be a binary indicator that is reflective of the presence of traffic to be served by the associated cell 130. By way of specific example, upon determining that a loading indicator associated with a cell 130 is set, cell loading analyzer 512 can facilitate computation of an interference estimate under the assumption that the cell 130 is transmitting at its nominal power across the entire bandwidth. Alternatively, if the loading indicator is not set, cell loading analyzer 512 can facilitate interference computation under an assumption that no transmissions are being conducted from the cell 130. In an alternative example, a multi-bit loading indicator can be utilized that can convey, for example, an average percentage of bandwidth and/or power usage by an associated cell 130 and/or any other suitable indicator(s). In one example, such a loading indicator can be utilized by cell loading analyzer 512 to compute an effective interference contribution from the corresponding cell 130.

Referring now to FIGS. 6-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 6:
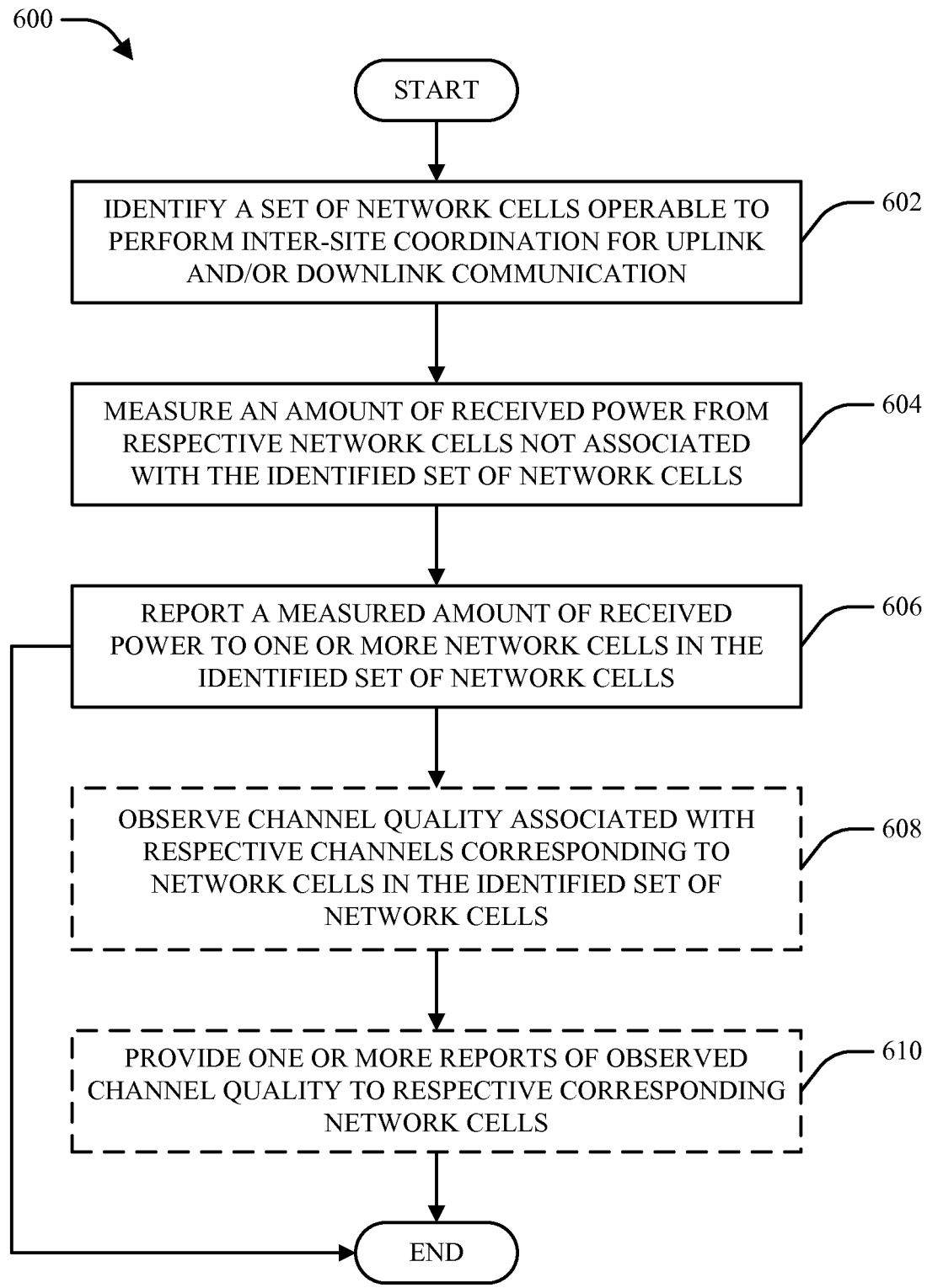
FIGS. 6-8 is are flow diagrams of respective methodologies for interference measurement and reporting in a N-MIMO communication system.

With reference to FIG. 6, illustrated is a methodology 600 for interference measurement and reporting in a N-MIMO communication system. It is to be appreciated that methodology 600 can be performed by, for example, a user device (e.g., UE 110) and/or any other appropriate network device. Methodology 600 can begin at block 602, wherein a set (e.g., serving set 102) of network cells operable to perform inter-site coordination for uplink and/or downlink communication (e.g., serving cell(s) 120) are identified. Next, at block 604, an amount of received power from respective network cells not associated with the set of network cells identified at block 602 (e.g., non-serving cell(s) 130) is measured (e.g., via an interference measurement module 112). At block 606, a measured amount of received power as measured at block 604 can then be reported (e.g., using an interference reporting module 114) to one or more network cells in the set identified at block 602.

Upon completing the acts described at block 606, methodology 600 can conclude. Alternatively, methodology can optionally proceed to blocks 608 and 610 prior to concluding. At block 608, channel quality associated with respective channels corresponding to network cells in the set identified at block 602 is observed (e.g., by a per-node channel analysis module 116). At block 610, one or more reports of channel quality as observed at block 608 are provided (e.g., using a channel reporting module 118) to respective corresponding network cells.

Figure 7:
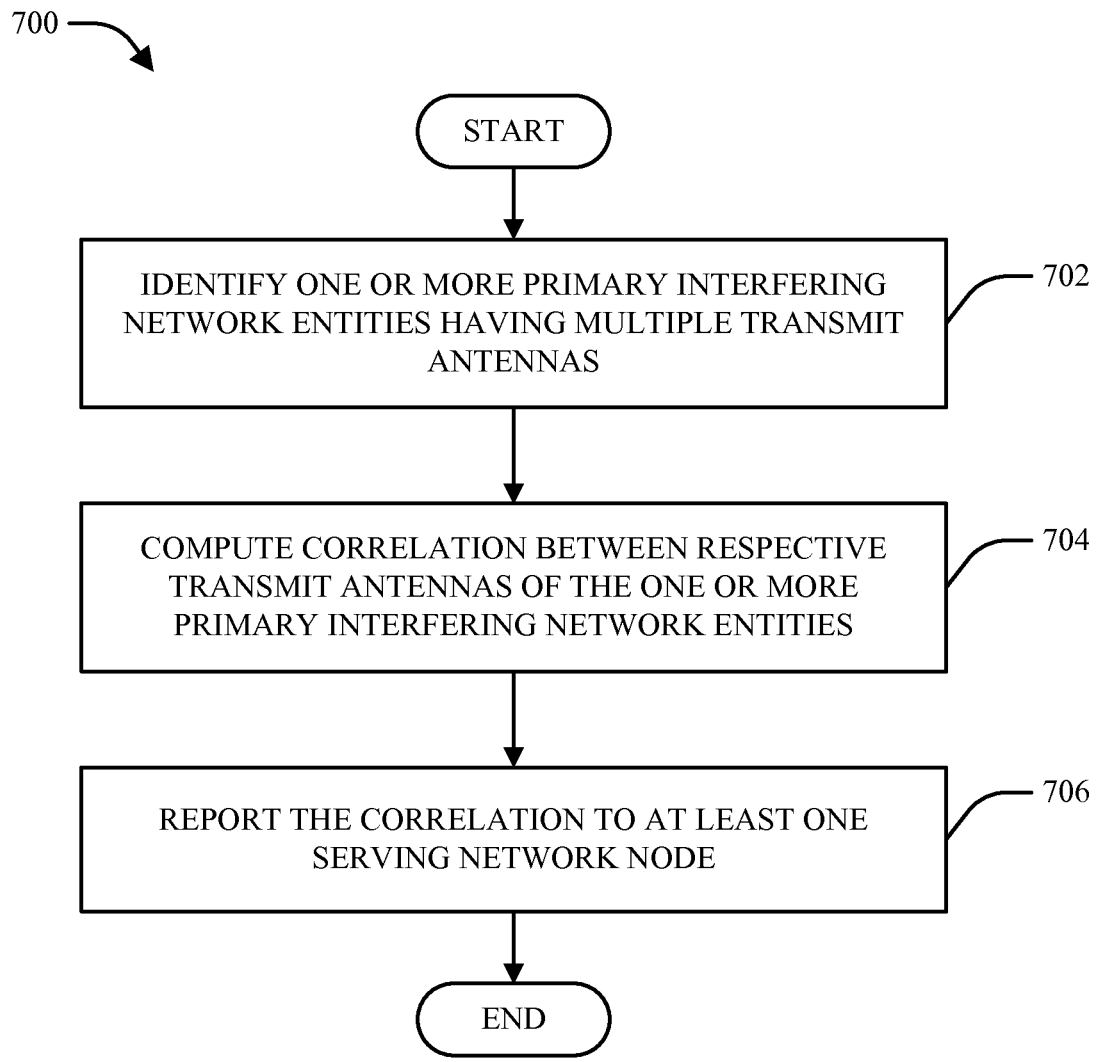

Turning next to FIG. 7, a flow diagram of a methodology 700 for leveraging correlation data for interference reporting in a wireless communication system is illustrated. Methodology 700 can be performed by, for example, a UE and/or any other appropriate network entity. Methodology 700 begins at block 702, wherein one or more primary interfering network entities (e.g., network cells 120 and/or 130) having multiple transmit antennas are identified (e.g., using a primary interferer identification module 212). At block 704, correlation between respective transmit antennas of the one or more primary interfering network entities identified at block 704 is computed (e.g., via a correlation analyzer 214). Methodology 700 can then conclude at block 706, wherein the correlation computed at block 704 is reported to at least one serving network node.

Figure 8:
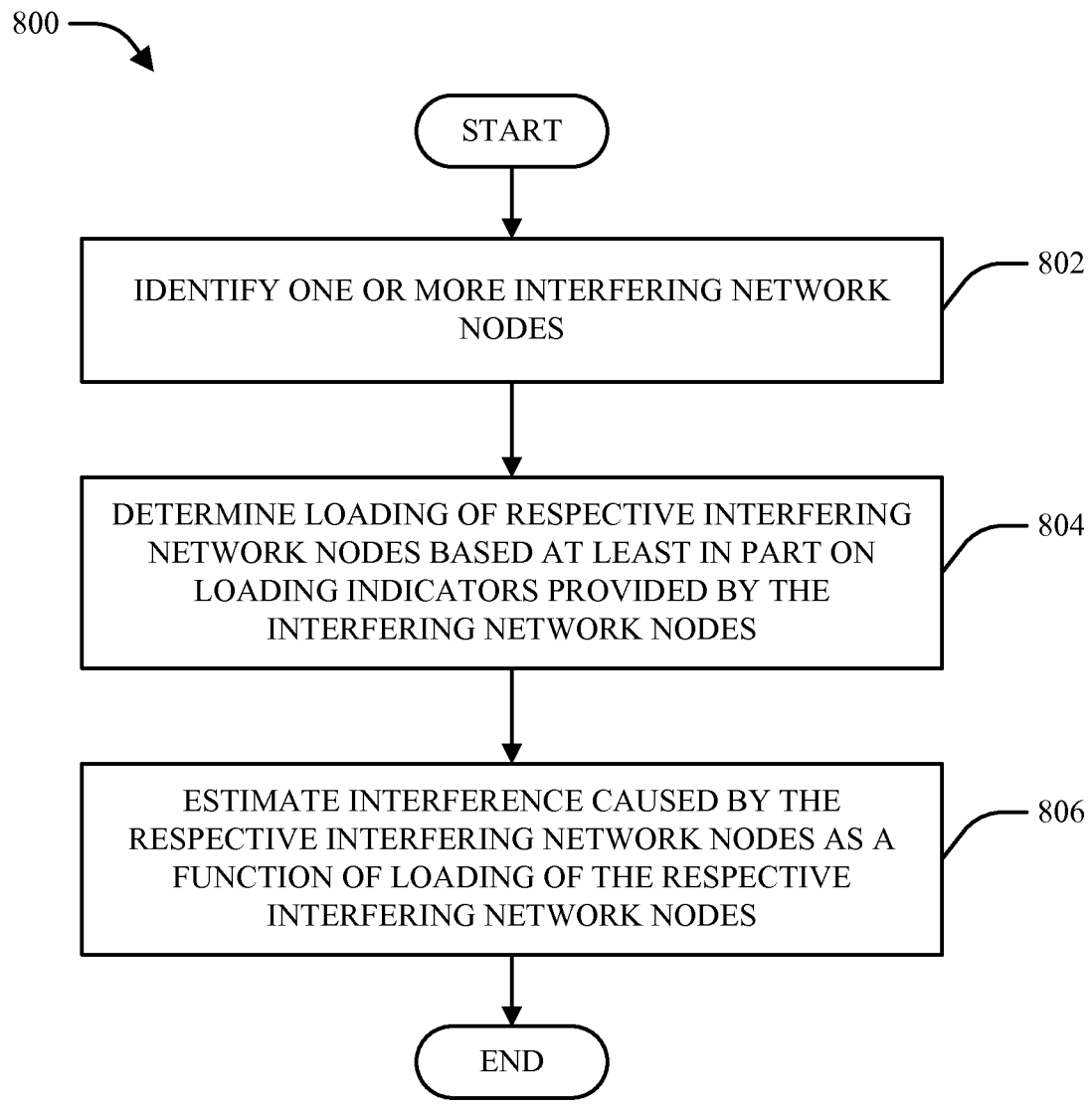

FIG. 8 illustrates a methodology 800 for leveraging node loading data for interference reporting in a wireless communication system. Methodology 800 can be performed by, for example, a mobile station and/or any other appropriate network entity. Methodology 800 begins at block 802, wherein one or more interfering network nodes are identified. Next, at block 804, loading of respective interfering network nodes identified at block 802 is determined (e.g., using a cell loading analyzer 512) based at least in part on loading indicators provided by the interfering network nodes (e.g., via a loading indicator module 524). Methodology 800 can then conclude at block 806, wherein interference caused by the respective interfering network nodes is estimated as a function of their loading as determined at block 804.

Figure 9:
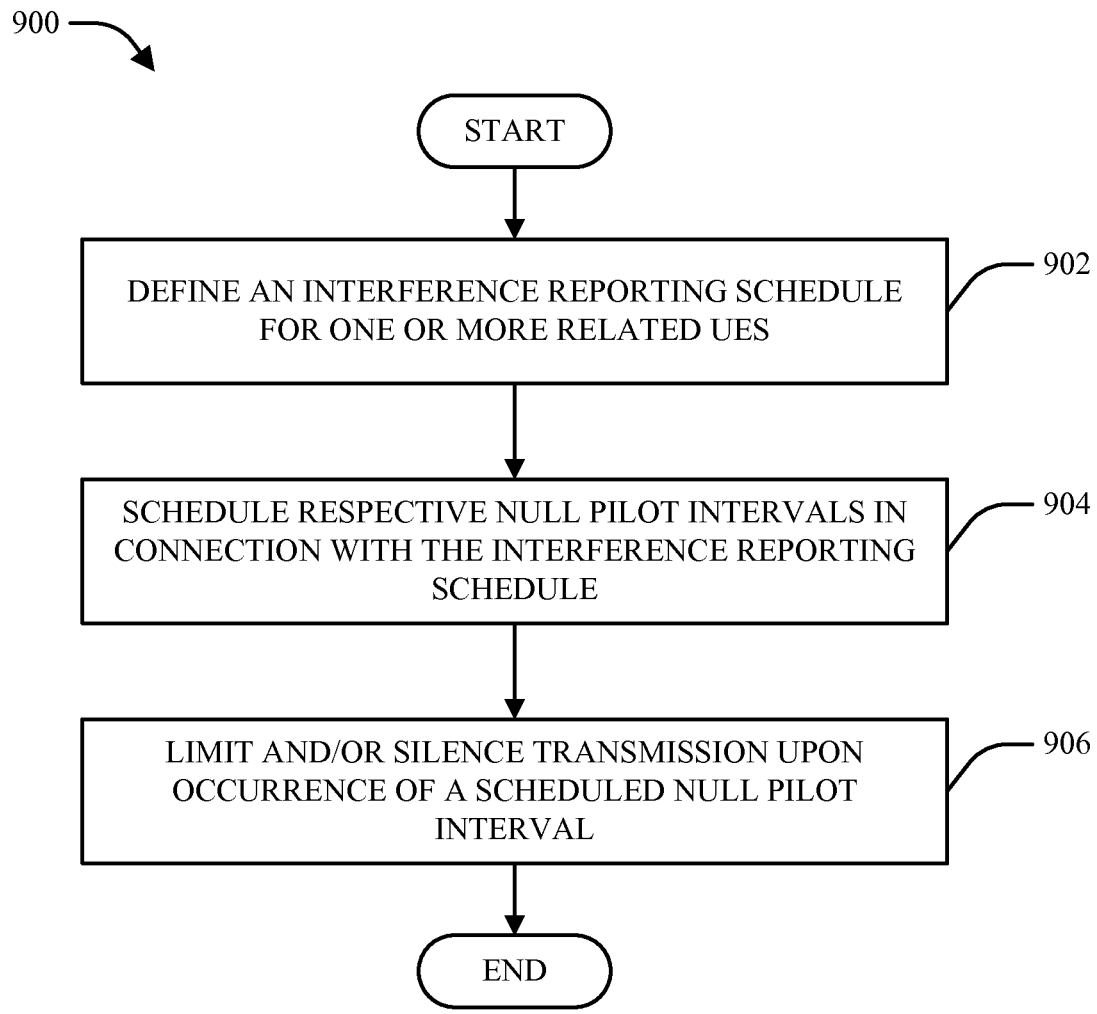
FIG. 9 is a flow diagram of a methodology for managing an interference reporting schedule in a N-MIMO communication system.

With reference next to FIG. 9, illustrated is a methodology 900 for managing an interference reporting schedule in a N-MIMO communication system. It is to be appreciated that methodology 900 can be performed by, for example, a network node (e.g., a serving cell 120) and/or any other appropriate network entity. Methodology 900 can begin at block 902, wherein an interference reporting schedule for one or more related UEs (e.g., UEs 110) is defined. Next, at block 904, respective null pilot intervals are scheduled (e.g., by a null pilot management module 412) within the interference reporting schedule defined at block 902. Methodology 900 can then conclude at block 906, wherein transmission by an entity performing methodology 900 is limited and/or silenced upon occurrence of respective null pilot intervals as scheduled at block 904.

Figure 10:
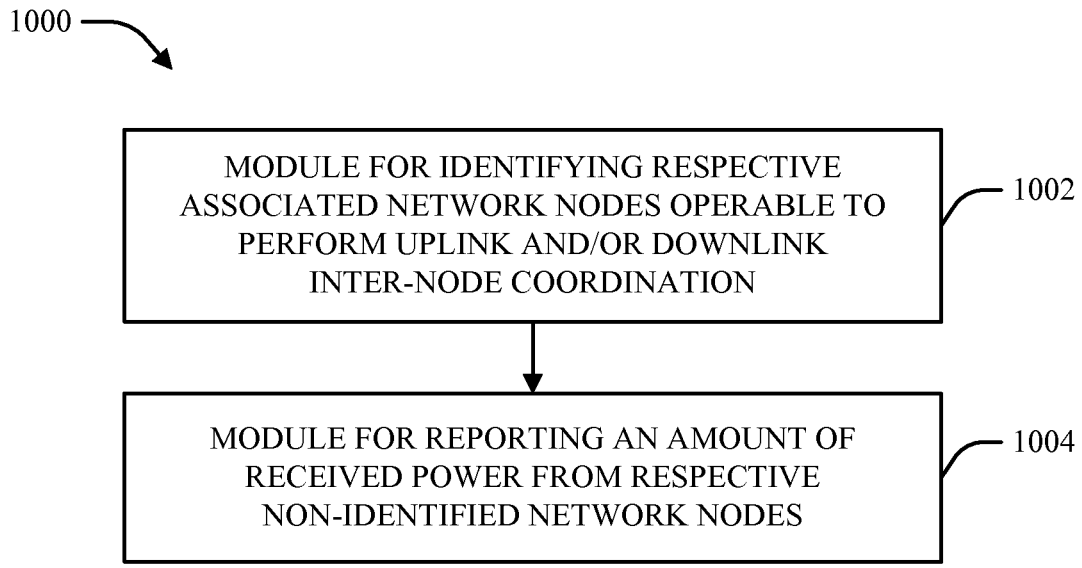
FIGS. 10-11 are block diagrams of respective apparatuses that facilitate reporting and processing of interference information in a wireless communication system.
Figure 11:
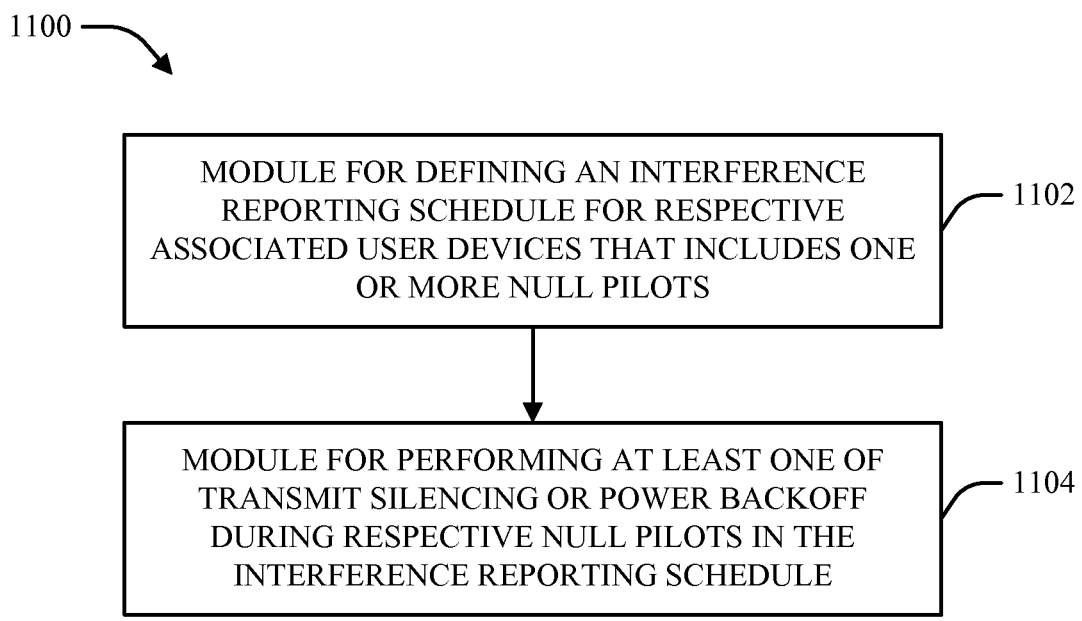

Referring now to FIGS. 10-11, respective apparatuses 1000-1100 that facilitate reporting and processing of interference information in a wireless communication system are illustrated. It is to be appreciated that apparatuses 1000-1100 are represented as including functional blocks, which can be functional blocks that represent functions implemented by a processor, software, or combination thereof (e.g., firmware).

Turning first to FIG. 10, an apparatus 1000 that facilitates reporting and processing of interference information in a wireless communication system is illustrated. Apparatus 1000 can be implemented by a user station (e.g., UE 110) and/or another suitable network entity and can include a module 1002 for identifying respective associated network nodes operable to perform uplink and/or downlink inter-node coordination and a module 1004 for reporting an amount of received power from respective non-identified network nodes FIG. 11 illustrates another apparatus 1100 that facilitates reporting and processing of interference information in a wireless communication system. Apparatus 1100 can be implemented by a network node designated as a serving network node for a given user (e.g., a serving cell 120 for a UE 110) and/or another suitable network entity and can include a module 1102 for defining an interference reporting schedule for respective associated user devices that includes one or more null pilots and a module 1104 for performing at least one of transmit silencing or power backoff during respective null pilots in the interference reporting schedule.

Figure 12:
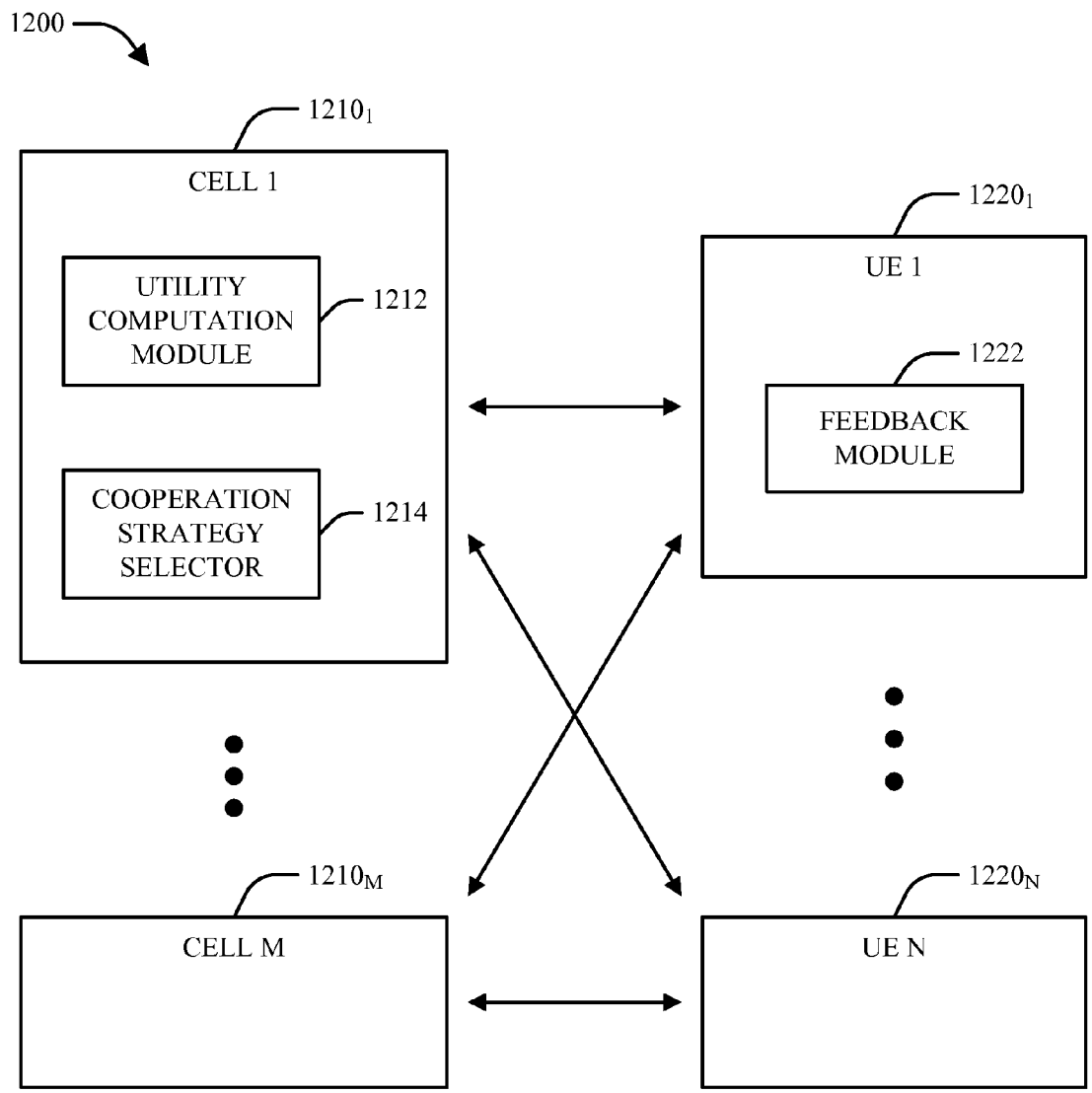
FIGS. 12-13 are block diagrams of respective example systems that facilitate coordinated multipoint communication in accordance with various aspects described herein.

Referring now to FIG. 12, an example system 1200 that facilitates coordinated multipoint communication in accordance with various aspects is illustrated. As illustrated in FIG. 12, system 1200 can include one or more network cells 1210 and/or other network nodes, which can communicate with respective UEs 1220 as generally described herein. In accordance with one aspect, respective cells 1210 in system 1200 can coordinate pursuant to one or more cooperation strategies in order to increase data rates associated with communication with a given UE 1220 and/or to reduce interference caused to other cells 1210 and/or UEs 1220 in system 1200. In one example, respective cells 1210 in system 1200 can be operable to utilize various cooperation techniques for uplink and/or downlink communication with one or more UEs 1220, such as coordinated silencing (CS), joint transmission (JT) via inter-eNodeB (inter-cell) packet sharing, coordinated beamforming (CBF), and/or any other suitable cell cooperation technique(s) as generally known in the art.

In another example, various operational aspects of system 1200, such as respective cell cooperation techniques to be utilized for communication, cells 1210 to be utilized for such cooperation techniques, and respective UEs 1220 to be served via cooperative communication, can be controlled by a utility computation module 1212 and/or other suitable mechanisms of respective cells 1210. Further, determinations made by utility computation module 1212 can be supported at least in part by marginal utility calculations performed by one or more cells 1210 (e.g., via a utility computation module 1214) and/or any other suitable metric.

In general, a cooperation strategy selector 1214 can be utilized by a cell 1210 to compute and/or make scheduling decisions relating to node clustering, scheduling, forms of cooperative transmission to be utilized, and so on. A cooperation strategy can be selected by cooperation type selector 1214 based on factors such as UE mobility, C/I levels associated with respective UEs 1220, capabilities of backhaul links between respective cells, or the like. By way of example, cooperation type selector 1214 can select CS and/or another similar simple form of cell cooperation in the case of high-mobility UEs and/or rapidly changing channel conditions associated with a given UE 1220. Additionally or alternatively, if mobility of a given UE 1220 is determined to be low, or a high degree of antenna correlation is present with respect to the UE 1220, more advanced cooperation techniques such as JT via inter-cell packet sharing (e.g., in the case of a relatively slow backhaul link between cells 1210) or CBF (e.g., in the case of a relatively fast backhaul link between cells 1210) can be selected. In another example, utility computation module 1212 and/or cooperation strategy selector 1214 can operate based at least in part on information obtained from respective UEs 1220 (e.g., via a feedback module 1222 at the respective UEs 1220).

In accordance with one aspect, a projected rate associated with respective UEs 1220 can be calculated (e.g., by utility computation module 1212) and leveraged with factors such as backhaul bandwidth, latency constraints, or the like, to select between respective cooperation techniques. For example, cooperation type selector 1212 can rule out a JT technique using backhaul bandwidth and latency uncertainty based on associated a priori and/or long-term backhaul link classifications. In another example, channel state information at the transmitter (CSIT) delivery delay and accuracy, as well as scheduling delay and/or other suitable factors, can be factored in projected rate calculation.

By way of specific example, cooperation type selector 1214 can utilize a set of cooperation technique selection rules as follows. First, cooperation type selector 1214 can rule out a JT technique based on a long-term backhaul link classification. Further, cooperation type selector 1214 can consider CBF techniques over JT in the event that a ratio of a combined energy C/I to the best node C/I is below a predefined threshold. In addition, if an associated channel prediction error is above a threshold value, cooperation type selector 1214 can consider CS (e.g., in the event that CBF and/or JT are possible).

In accordance with another aspect, utility computation module 1212 can compute per-UE projected rates based on various factors. These factors can include, for example, propagation channels for respective links involved in a utilized cooperation strategy (e.g., taking into account power and bandwidth resources allocated per link); channel prediction accuracy based on projected downlink estimation error at respective UEs 1220 and corresponding feedback delay; anticipated interference levels from cooperative and non-cooperative network nodes (e.g., cells 1210 and/or UEs 1220), taking into account spatial interference structures as applicable; and/or any other suitable factors. In one example, respective UEs 1220 in system 1200 can provide information relating to downlink estimation errors, feedback delay, UE processing loss, interference nulling capability, and/or other information relating to the operational capabilities of the respective UEs 1220 to respective cells 1210 via feedback module 1222 and/or any other suitable means.

In one example, utility computation module 1212 can perform utility computations for a given UE 1220 based on various requirements for channel state information at the transmitter (CSIT). CSIT requirements can vary, for example, based on a cooperation strategy employed by respective cells 1210 with respect to a given UE 1220. By way of specific example, it can be appreciated that CSIT requirements associated with iterative signal processing and/or CBF can differ substantially between CSIT requirements for CS. In one example, a cell 1210 can utilize an assumption of accurate CSIT at moderate to high post-processing carrier to interference (C/I) levels in order to employ first order approximation of an associated CSIT effect. Additionally or alternatively, in the event that a substantially high error effect (e.g., due to spatial error) is encountered, CS can be favored by cell 1210 over more complex signal processing techniques. In accordance with one aspect, a threshold at which CS is selected over such techniques can be based on an empirical measure of channel prediction, as described in further detail herein.

In accordance with a further aspect, cooperation strategy selector 1214 can utilize one or more strategy utility maximization techniques for optimizing a cooperation strategy to be utilized with respect to respective UEs 1220. For example, one or more iterative utility maximization algorithms (e.g., algorithms similar to iterative pricing) can be utilized, wherein an iterative search is performed at respective network nodes (e.g., cells 1210, sectors within cells 1210, etc.) for respective candidate cooperation strategies. In one example, various cooperation technique constraints can be considered, which can be, for example, reflected in constraints on the beam coefficients of various nodes. In another example, first order extension can be utilized to update respective beam weights at respective iterations until convergence. In various implementations, convergence can be made dependent on an algorithm starting point, which can be selected in a variety of manners. For example, a starting point can be selected via zero-forcing (ZF) across respective cooperating nodes, maximum ratio combining (MRC) and/or MMSE-based approaches, or the like. In one example, power allocation techniques can be applied in addition to ZF and/or MRC.

Figure 13:
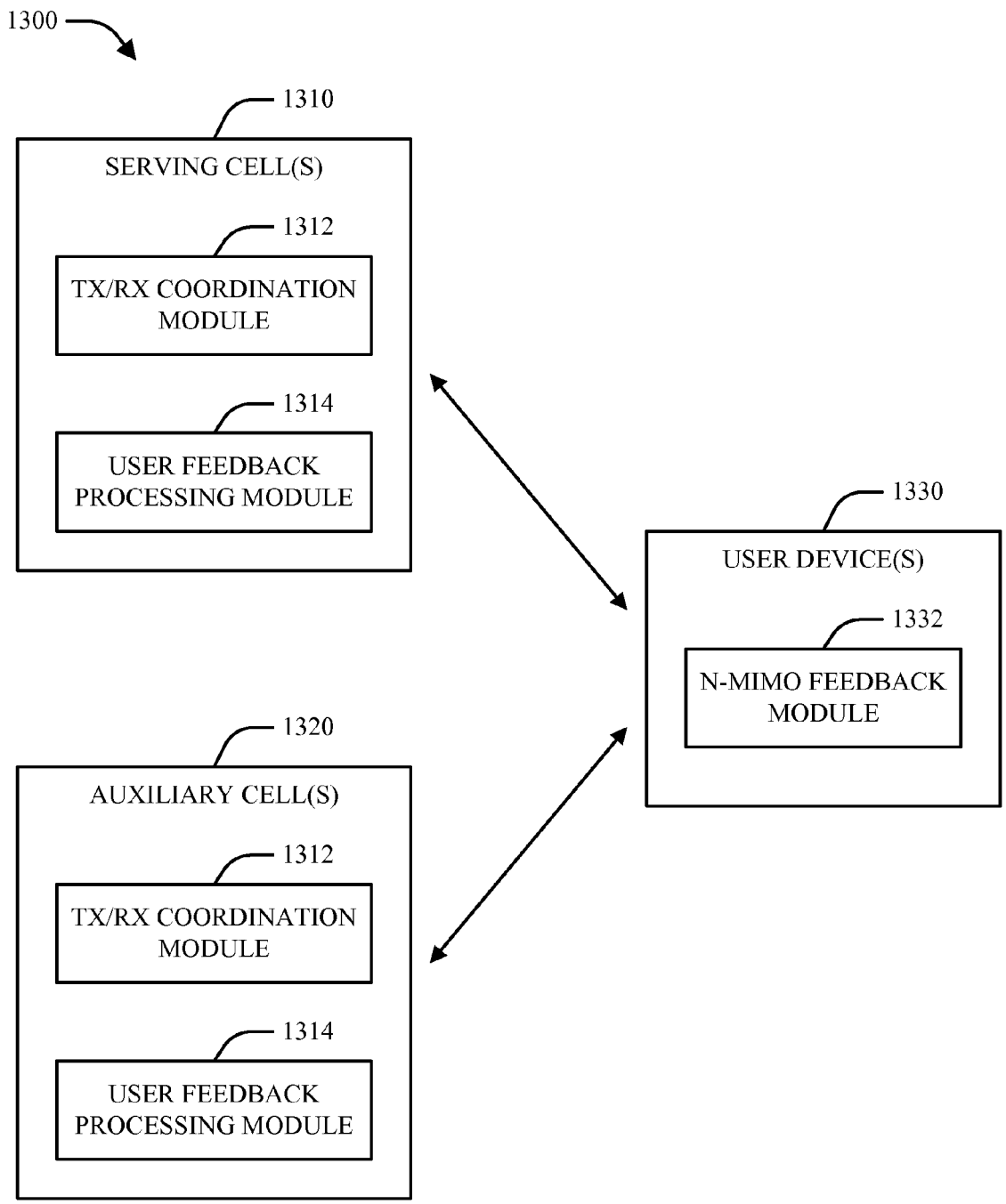

Referring next to FIG. 13, an example system 1300 that facilitates coordinated multipoint communication in accordance with various aspects described herein is illustrated. As FIG. 13 illustrates, system 1300 can include respective user devices 1330 that can communicate with one or more associated network cells, such as serving cell(s) 1310 and auxiliary cell(s) 1320. It should be appreciated, however, that no functionality of cells 1310-1320 is intended to be implied by the naming of "serving cell(s)" 1310 and "auxiliary cell(s)" 1320. For example, it should be appreciated that an auxiliary cell 1320 can serve a user device 1330 by providing communication coverage for user device 1330 in addition to, or in place of, a serving cell 1310 in some cases.

In accordance with one aspect, respective serving cells 1310 and auxiliary cells 1320 can cooperate to perform N-MIMO or CoMP communication with one or more user devices 1330. For example, various techniques can be utilized to facilitate cooperation between respective cells 1310-1320, between respective sectors associated with one or more cells 1310-1320, and/or any other suitable network entities. Such cooperation can be facilitated by, for example, a TX/RX coordination module 1312 associated with respective cells 1310-1320 and/or any other suitable mechanism(s). Further, TX/RX coordination module 1312 can facilitate cooperation between respective network entities according to any suitable network cooperation strategy(ies), such as fractional frequency reuse, silencing, coordinated beamforming, joint transmission, or the like.

In one example, coordinated beamforming can be conducted between network nodes associated with respective cells 1310-1320 by coordinating transmissions from the respective cells 1310-1320 such that if a transmission to a user device 1330 occurs from a given cell 1310 or 1320, a beam is chosen to serve the user device 1330 by the given cell 1310 or 1320 such that the transmission to the user device 1330 is orthogonal or otherwise substantially mismatched to user devices scheduled on neighboring cells 1310 and/or 1320. By doing so, it can be appreciated that beamforming gains can be realized for a desired user device 1330 while simultaneously reducing the effects of interference on neighboring network devices. In one example, coordinated beamforming can be facilitated by performing scheduling, beam selection, user selection (e.g., by selecting user devices 1330 having desirable beams that substantially limit interference at neighboring devices), or the like.

Additionally or alternatively, joint transmission can be conducted between a plurality of network nodes and a given user device 1330 by, for example, pooling resources designated for transmission to a given user device 1330 and transmitting the pooled resources via multiple distinct network nodes (e.g., nodes corresponding to a serving cell 1310 as well as an auxiliary cell 1320). For example, instead of a first cell transmitting a modulation symbol x to a first user and a second cell transmitting a modulation symbol y to a second user, the cells can cooperate such that the first cell transmits ax+by to one or both of the users and the second cell transmits cx+dy to the same user(s), where a, b, c, and d are coefficients chosen to optimize the signal-to-noise ratio (SNR) of the users, system capacity, and/or any other suitable metric(s). In one example, resource pooling among network nodes corresponding to different cells 1310-1320 can be conducted via a backhaul link between the cells 1310-1320 and/or any other suitable mechanism. In another example, similar techniques can be utilized for uplink joint transmission, wherein a user device 1330 can be configured to transmit data, control signaling, and/or other appropriate information to multiple network nodes.

In accordance with one aspect, various aspects of uplink and downlink CoMP communication can be based on feedback provided by respective user devices 1330. For example, a N-MIMO feedback module 1332 at respective user devices 1330 can be utilized to provide feedback to various cells 1310-1320, which in turn can utilize a user feedback processing module 1314 and/or other suitable means to utilize the feedback in conducting cooperative communication within system 1300. By way of example, in the case of downlink CoMP communication, a N-MIMO feedback module 1332 at user device(s) 1330 can facilitate channel reporting to respective cells 1310-1320 of respective serving cells as well as one or more neighboring non-cooperative cells. By way of another example, in the case of uplink CoMP communication, N-MIMO feedback module 1332 can provide feedback information to respective cells 1310-1320 in combination with respectively scheduled uplink transmissions to the cells 1310-1320 that can be utilized by the cells 1310-1320 to facilitate the removal of interference from the corresponding uplink transmissions.

Figure 14:
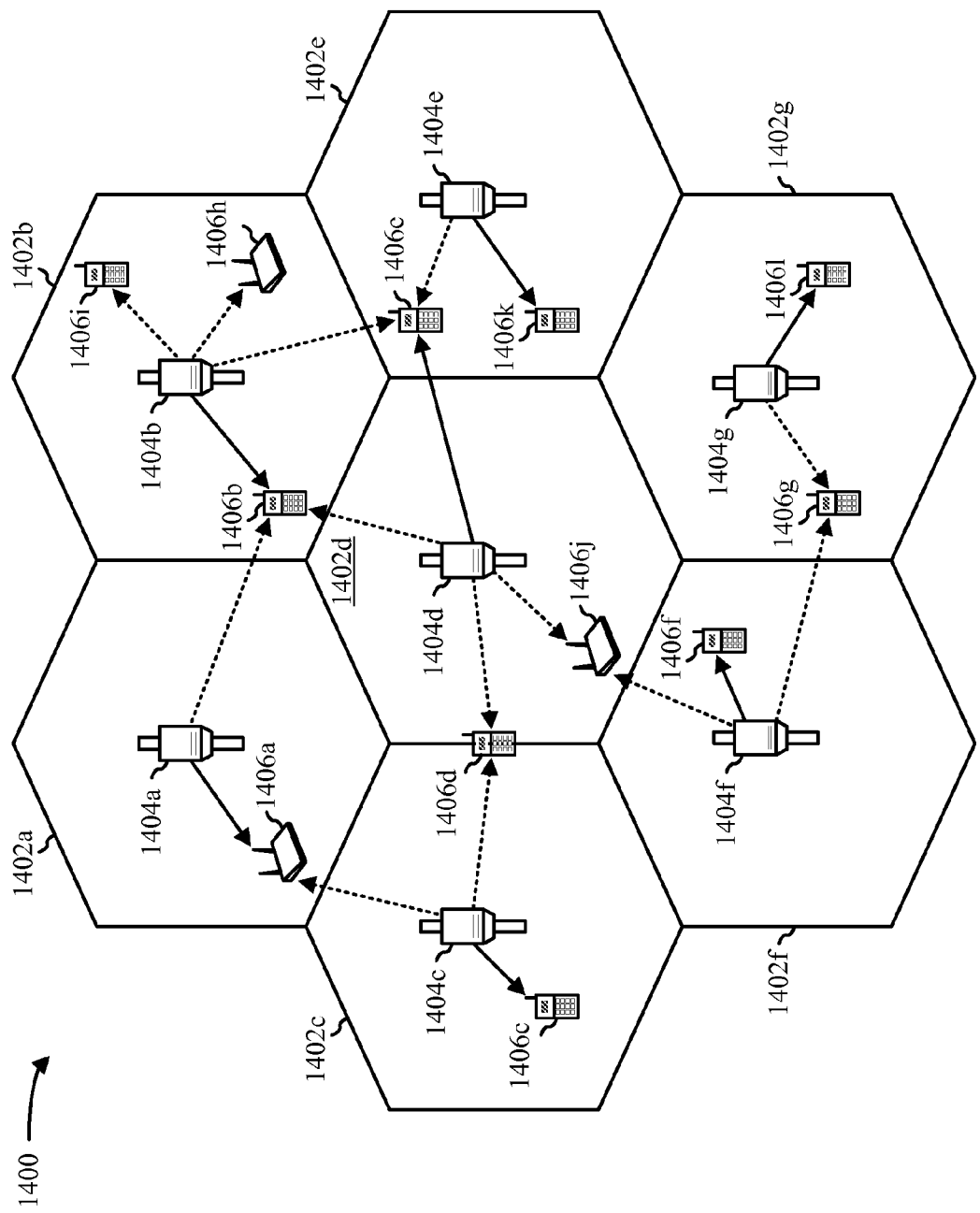
FIG. 14 illustrates an example wireless communication system in accordance with various aspects set forth herein.

Turning to FIG. 14, an exemplary wireless communication system 1400 is illustrated. In one example, system 1400 can be configured to support a number of users, in which various disclosed embodiments and aspects can be implemented. As shown in FIG. 14, by way of example, system 1400 can provide communication for multiple cells 1402, (e.g., macro cells 1402a-1402g), with respective cells being serviced by corresponding access points (AP) 1404 (e.g., APs 1404a-1404g). In one example, one or more cells can be further divided into respective sectors (not shown).

As FIG. 14 further illustrates, various access terminals (ATs) 1406, including ATs 1406a-1406k, can be dispersed throughout system 1400. In one example, an AT 1406 can communicate with one or more APs 1404 on a forward link (FL) and/or a reverse link (RL) at a given moment, depending upon whether the AT is active and whether it is in soft handoff and/or another similar state. As used herein and generally in the art, an AT 1406 can also be referred to as a user equipment (UE), a mobile terminal, and/or any other suitable nomenclature. In accordance with one aspect, system 1400 can provide service over a substantially large geographic region. For example, macro cells 1402a-1402g can provide coverage for a plurality of blocks in a neighborhood and/or another similarly suitable coverage area.

Figure 15:
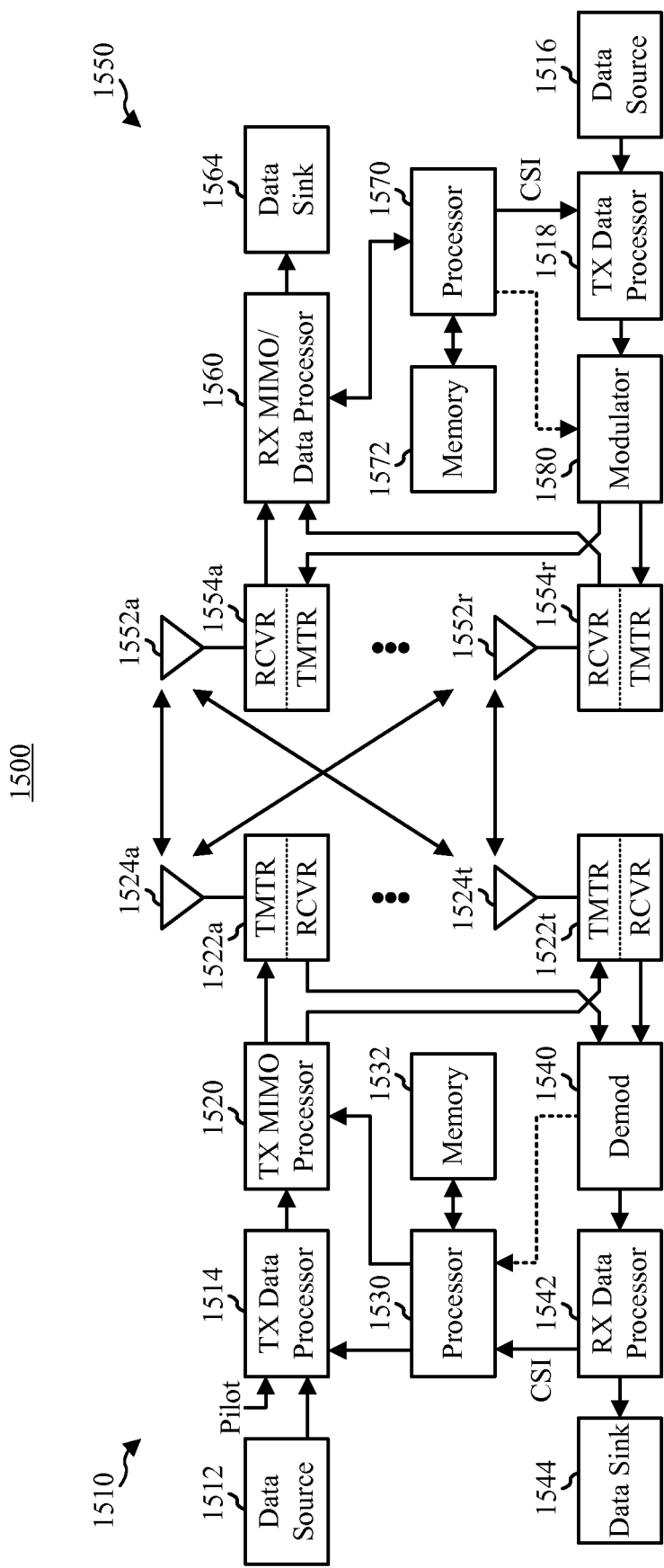
FIG. 15 is a block diagram illustrating an example wireless communication system in which various aspects described herein can function.

Referring now to FIG. 15, a block diagram illustrating an example wireless communication system 1500 in which various aspects described herein can function is provided. In one example, system 1500 is a multiple-input multiple-output (MIMO) system that includes a transmitter system 1510 and a receiver system 1550. It should be appreciated, however, that transmitter system 1510 and/or receiver system 1550 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1510 and/or receiver system 1550 described herein could be utilized in connection with a single output to single input antenna system.

In accordance with one aspect, traffic data for a number of data streams are provided at transmitter system 1510 from a data source 1512 to a transmit (TX) data processor 1514. In one example, each data stream can then be transmitted via a respective transmit antenna 1524. Additionally, TX data processor 1514 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1550 to estimate channel response. Back at transmitter system 1510, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1530.

Next, modulation symbols for all data streams can be provided to a TX processor 1520, which can further process the modulation symbols (e.g., for OFDM). TX MIMO processor 1520 can then provides $N_T$ modulation symbol streams to $N_T$ transceivers 1522a through 1522t. In one example, each transceiver 1522 can receive and process a respective symbol stream to provide one or more analog signals. Each transceiver 1522 can then further condition (e.g., amplify, filter, and upconvert) the analog signals to provide a modulated signal suitable for transmission over a MIMO channel. Accordingly, $N_T$ modulated signals from transceivers 1522a through 1522t can then be transmitted from $N_T$ antennas 1524a through 1524t, respectively.

In accordance with another aspect, the transmitted modulated signals can be received at receiver system 1550 by $N_R$ antennas 1552a through 1552r. The received signal from each antenna 1552 can then be provided to respective transceivers 1554. In one example, each transceiver 1554 can condition (e.g., filter, amplify, and downconvert) a respective received signal, digitize the conditioned signal to provide samples, and then processes the samples to provide a corresponding "received" symbol stream. An RX MIMO/data processor 1560 can then receive and process the $N_R$ received symbol streams from $N_R$ transceivers 1554 based on a particular receiver processing technique to provide $N_T$ "detected" symbol streams. In one example, each detected symbol stream can include symbols that are estimates of the modulation symbols transmitted for the corresponding data stream. RX processor 1560 can then process each symbol stream at least in part by demodulating, deinterleaving, and decoding each detected symbol stream to recover traffic data for a corresponding data stream. Thus, the processing by RX processor 1560 can be complementary to that performed by TX MIMO processor 1520 and TX data processor 1516 at transmitter system 1510.

RX processor 1560 can additionally provide processed symbol streams to a data sink 1564.

In accordance with one aspect, the channel response estimate generated by RX processor 1560 can be used to perform space/time processing at the receiver, adjust power levels, change modulation rates or schemes, and/or other appropriate actions. Additionally, RX processor 1560 can further estimate channel characteristics such as, for example, signal-to-noise-and-interference ratios (SNRs) of the detected symbol streams. RX processor 1560 can then provide estimated channel characteristics to a processor 1570. In one example, RX processor 1560 and/or processor 1570 can further derive an estimate of the "operating" SNR for the system. Processor 1570 can then provide channel state information (CSI), which can comprise information regarding the communication link and/or the received data stream. This information can include, for example, the operating SNR. The CSI can then be processed by a TX data processor 1518, modulated by a modulator 1580, conditioned by transceivers 1554*a* through 1554*r*, and transmitted back to transmitter system 1510. In addition, a data source 1512 at receiver system 1550 can provide additional data to be processed by TX data processor 1518.

Back at transmitter system 1510, the modulated signals from receiver system 1550 can then be received by antennas 1524, conditioned by transceivers 1522, demodulated by a demodulator 1540, and processed by a RX data processor 1542 to recover the CSI reported by receiver system 1550. In one example, the reported CSI can then be provided to processor 1530 and used to determine data rates as well as coding and modulation schemes to be used for one or more data streams. The determined coding and modulation schemes can then be provided to transceivers 1522 for quantization and/or use in later transmissions to receiver system 1550. Additionally and/or alternatively, the reported CSI can be used by processor 1530 to generate various controls for TX data processor 1514 and TX MIMO processor 1520. In another example, CSI and/or other information processed by RX data processor 1542 can be provided to a data sink 1544.

In one example, processor 1530 at transmitter system 1510 and processor 1570 at receiver system 1550 direct operation at their respective systems. Additionally, memory 1532 at transmitter system 1510 and memory 1572 at receiver system 1550 can provide storage for program codes and data used by processors 1530 and 1570, respectively. Further, at receiver system 1550, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 16:
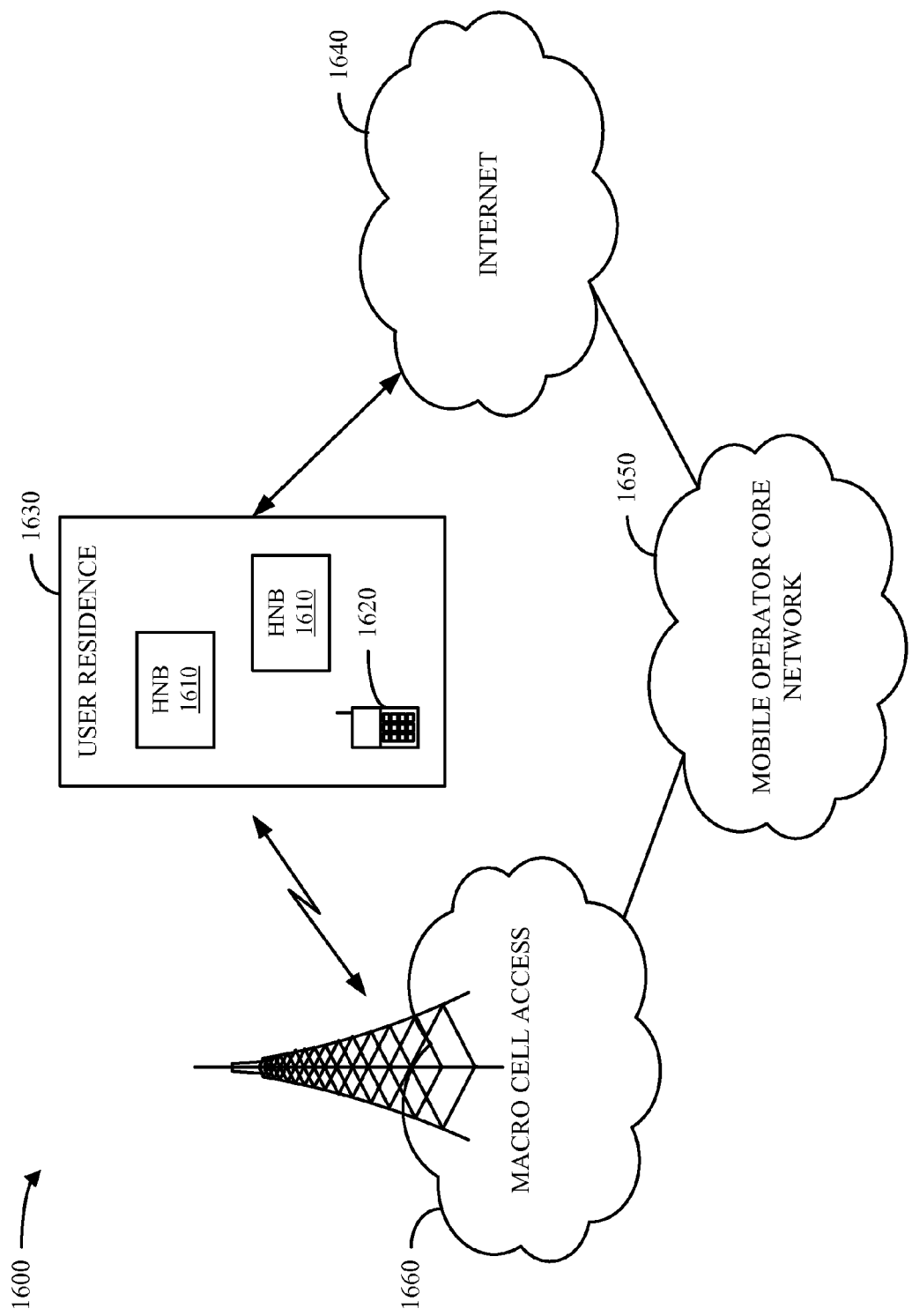
FIG. 16 illustrates an example communication system that enables deployment of access point base stations within a network environment.

FIG. 16 illustrates an example communication system 1600 that enables deployment of access point base stations within a network environment. As shown in FIG. 16, system 1600 can include multiple access point base stations (e.g., femto cells or Home Node B units (HNBs)) such as, for example, HNBs 1610. In one example, respective HNBs 1610 can be installed in a corresponding small scale network environment, such as, for example, one or more user residences 1630. Further, respective HNBs 1610 can be configured to serve associated and/or alien UE(s) 1620. In accordance with one aspect, respective HNBs 1610 can be coupled to the Internet 1640 and a mobile operator core network 1650 via a DSL router, a cable modem, and/or another suitable device (not shown). In accordance with one aspect, an owner of a femto cell or HNB 1610 can subscribe to mobile service, such as, for example, 3G/4G mobile service, offered through mobile operator core network 1650. Accordingly, UE 1620 can be enabled to operate both in a macro cellular environment 1660 and in a residential small scale network environment.

In one example, UE 1620 can be served by a set of Femto cells or HNBs 1610 (e.g., HNBs 1610 that reside within a corresponding user residence 1630) in addition to a macro cell mobile network 1660. As used herein and generally in the art, a home femto cell is a base station on which an AT or UE is authorized to operate on, a guest femto cell refers to a base station on which an AT or UE is temporarily authorized to operate on, and an alien femto cell is a base station on which the AT or UE is not authorized to operate on. In accordance with one aspect, a femto cell or HNB 1610 can be deployed on a single frequency or on multiple frequencies, which may overlap with respective macro cell frequencies.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method performed by a user equipment unit, the method comprising:
    identifying a set of network cells operable to conduct communication with inter-site coordination;
    measuring an amount of received power from one or more network cells not associated with the identified set of network cells;

reporting the measured amount of received power to one or more network cells in the identified set of network cells; and receiving communications from at least a subset of the identified set of network cells, the subset coordinated according to a coordination scheme selected at least in part based on the reported measured amount of received power.

2. The method of claim 1, further comprising:
observing channel quality associated with channels corresponding to respective network cells in the identified set of network cells;
providing one or more reports of observed channel quality to respectively corresponding network cells; and
receiving the communications from the at least a subset of the set of network cells, the subset coordinated according to the coordination scheme selected at least in part on the provided one or more reports.

3. The method of claim 1, wherein:
the measuring comprises identifying a primary interfering network cell; and
the reporting comprises reporting an identity of the primary interfering network cell to the one or more network cells in the identified set of network cells.

4. The method of claim 1, wherein:
the method further comprises identifying one or more interfering network cells respectively comprising a plurality of transmit antennas;
the measuring comprises computing a correlation between respective transmit antennas of the one or more interfering network cells; and
the reporting comprises reporting information relating to the computed correlation between the respective transmit antennas of the one or more interfering network cells to one or more network cells in the identified set of network cells.

5. The method of claim 4, wherein the one or more interfering network cells comprise a dominant interfering network cell.

6. The method of claim 4, wherein the reporting further comprises:
determining an amount of interference nulling that is employable relative to the one or more interfering network cells based on the computed correlation between the respective transmit antennas of the one or more interfering network cells;
estimating a projected rate for communication based on application of the determined amount of employable interference nulling; and
reporting the projected rate to one or more network cells in the identified set of network cells.

7. The method of claim 4, wherein the reporting further comprises:
identifying a plurality of associated receive antennas;
determining an amount of receiver interference nulling that is employable relative to the one or more interfering network cells via the plurality of associated receive antennas; and
reporting the determined amount of receiver interference nulling to the one or more network cells in the identified set of network cells.

8. The method of claim 7, wherein the reporting the determined amount of receiver interference nulling comprises:
estimating a projected rate for communication based on application of the determined amount of receiver interference nulling; and
reporting the projected rate to the one or more network cells in the identified set of network cells.

9. The method of claim 1, wherein the reporting comprises:
estimating a projected rate for communication based on the measured amount of received power; and
reporting the projected rate to the one or more network cells in the identified set of network cells.

10. The method of claim 1, wherein the reporting comprises reporting a measured amount of received power to the one or more network cells using Layer 1 (L1) signaling.

11. The method of claim 1, wherein the reporting comprises reporting a measured amount of received power to the one or more network cells using Layer 3 (L3) signaling.

12. The method of claim 1, wherein the measuring comprises measuring an amount of received power associated with one or more of reference signals or synchronization signals broadcasted from the one or more network cells not associated with the identified set of network cells.

13. The method of claim 12, wherein the measuring further comprises:
identifying a loading indicator within at least one of a reference signal or synchronization signal broadcasted from a network cell;
determining loading of the network cell based at least in part on the loading indicator; and
estimating interference caused by the network cell as a function of loading of the network cell.

14. The method of claim 13, wherein the identifying a loading indicator comprises identifying a loading indicator within a preamble of the reference signal or the synchronization signal.

15. The method of claim 1, wherein the measuring comprises measuring an amount of received power associated with at least one of reference signaling, a primary synchronization signal (PSS), a secondary synchronization signal (SSS), or Low Reuse Preamble (LRP) signaling communicated by the one or more network cells not associated with the identified set of network cells.

16. A wireless communications apparatus, comprising:
a memory that stores data relating to a set of serving network cells operable to conduct communication with inter-site coordination;
a processor configured to measure an amount of received power from one or more network cells not associated with the set of serving network cells and to report a measured amount of received power to one or more serving network cells; and
a receiver configured to receive communications from at least a subset of the set of serving network cells, the subset coordinated according to a coordination scheme selected at least in part based on the reported measured amount of received power.

17. The wireless communications apparatus of claim 16, wherein the processor is further configured to analyze quality of channels corresponding to at least one of the one or more serving network cells and to provide one or more reports of analyzed channel quality to the at least one of the one or more serving network cells.

18. The wireless communications apparatus of claim 16, wherein:
the memory further stores data relating to one or more interfering network cells, the one or more interfering network cells respectively comprising a plurality of transmit antennas; and
the processor is further configured to compute correlation between respective transmit antennas of the one or more interfering network cells and to report respective computed correlations between transmit antennas of respective interfering network cells to the one or more serving network cells.

19. The wireless communications apparatus of claim 18, wherein the one or more interfering network cells comprise a dominant interfering network cell.

20. The wireless communications apparatus of claim 18, wherein the processor is further configured to determine an amount of interference nulling that is employable relative to the one or more interfering network cells based on the respective computed correlations, to estimate a projected rate for communication associated with application of the determined amount of employable interference nulling, and to report the projected rate to the one or more serving network cells.

21. The wireless communications apparatus of claim 18, wherein:
the memory further stores data relating to a plurality of associated receive antennas; and
the processor is further configured to determine an amount of receiver interference nulling that is employable relative to one or more interfering network cells via the plurality of associated receive antennas and to report the determined amount of receiver interference nulling to the one or more serving network cells.

22. The wireless communications apparatus of claim 21, wherein the processor is further configured to estimate a projected communication rate based on application of the determined amount of receiver interference nulling and to report the determined amount of receiver interference nulling implicitly at least in part by reporting the projected communication rate to the one or more serving network cells.

23. The wireless communications apparatus of claim 16, wherein the processor is further configured to report a measured amount of received power to the one or more serving network cells using at least one of Layer 1 (L1) signaling or Layer 3 (L3) signaling.

24. The wireless communications apparatus of claim 16, wherein the processor is further configured to measure an amount of received power from a network cell not associated with the set of serving network cells based on at least one of reference signals or synchronization signals broadcasted from the network cell.

25. The wireless communications apparatus of claim 24, wherein the processor is further configured to identify a loading indicator provided within at least one of a reference signal or a synchronization signal broadcasted by a network cell, to determine loading of the network cell according to the loading indicator, and to estimate interference caused by the network cell as a function of loading of the network cell.

26. The wireless communications apparatus of claim 24, wherein the loading indicator is provided within a preamble of the reference signal or the synchronization signal.

27. The wireless communications apparatus of claim 16, wherein the processor is further configured to measure an amount of received power from a network cell based at least in part on at least one of reference signaling, a primary synchronization signal (PSS), a secondary synchronization signal (SSS), or Low Reuse Preamble (LRP) signaling communicated by the network cell and detected by the wireless communications apparatus.

28. An apparatus, comprising:
means for identifying a set of network cells operable to perform at least one of uplink communication or downlink communication using inter-site coordination;
means for reporting an amount of received power corresponding to one or more network cells not associated with the set of identified network cells; and
means for receiving communications from at least a subset of the identified set of network cells, the subset coordinated according to a coordination scheme selected at least in part based on the reported measured amount of received power.

29. The apparatus of claim 28, further comprising:
means for observing channel quality associated with channels corresponding to at least one of the identified set of network cells; and
means for providing one or more reports of observed channel quality to at least one of the identified set of network cells.

30. The apparatus of claim 28, wherein:
the apparatus further comprises means for identifying one or more interfering network cells having a plurality of transmit antennas; and
the means for reporting comprises means for reporting correlations between respective transmit antennas of the one or more interfering network cells to one or more of the identified network cells.

31. The apparatus of claim 30, wherein the means for reporting further comprises:
means for determining an employable amount of interference nulling relative to the one or more interfering network cells based on the correlations between transmit antennas of the one or more interfering network cells;
means for estimating a projected communication rate associated with application of the employable amount of interference nulling; and
means for reporting the projected communication rate to one or more of the identified network cells.

32. The apparatus of claim 30, wherein the means for reporting further comprises:
means for identifying a plurality of associated receive antennas;
means for determining an employable amount of receiver interference nulling relative to the one or more interfering network cells via the plurality of associated receive antennas;
means for estimating a projected communication rate associated with application of the determined amount of receiver interference nulling; and
means for reporting the projected communication rate to one or more of the identified network cells.

33. The apparatus of claim 28, wherein the means for reporting comprises means for providing one or more reports to an associated network cell using at least one of Layer 1 (L1) signaling or Layer 3 (L3) signaling.

34. The apparatus of claim 28, further comprising means for measuring an amount of received power corresponding to a network cell based on at least one of reference signals or synchronization signals broadcasted from the network cell.

35. The apparatus of claim 34, wherein the means for measuring comprises:
means for identifying a loading indicator within at least one of a reference signal or a synchronization signal broadcasted from the network cell;
means for determining loading of the network cell based on the loading indicator; and
means for estimating interference caused by the network cell as a function of loading of the network cell.

36. The apparatus of claim 34, wherein the means for measuring comprises means for measuring an amount of received power corresponding to a network cell based on at least one of reference signaling, a primary synchronization signal (PSS), a secondary synchronization signal (SSS), or Low Reuse Preamble (LRP) signaling communicated by the network cell.

37. A computer program product, comprising:
a non-transitory computer-readable medium, comprising:
code for causing a computer to identify a set of network cells operable to perform at least one of uplink communication or downlink communication using inter-site coordination; and
code for causing a computer to report an amount of received power corresponding to one or more network cells not associated with the set of identified network cells; and
code for causing a computer to receive communications from at least a subset of the identified set of network cells, the subset coordinated according to a coordination scheme selected at least in part based on the reported measured amount of received power.

38. The computer program product of claim 37, wherein the non-transitory computer-readable medium further comprises:
code for causing a computer to observe channel quality associated with channels corresponding to at least one of the identified network cells; and
code for causing a computer to provide one or more reports of observed channel quality to at least one of the identified network cells.

39. The computer program product of claim 37, wherein:
the non-transitory computer-readable medium further comprises code for causing a computer to identify one or more interfering network cells having a plurality of transmit antennas; and
the code for causing a computer to report comprises code for causing a computer to report correlation between respective transmit antennas of the one or more interfering network cells to one or more of the identified network cells.

40. The computer program product of claim 37, wherein the code for causing a computer to report comprises code for causing a computer to provide one or more reports to one or more of the identified network cells using at least one of Layer 1 (L1) signaling or Layer 3 (L3) signaling.

41. The computer program product of claim 37, wherein the non-transitory computer-readable medium further comprises code for causing a computer to measure an amount of received power corresponding to a network cell based on at least one of reference signals or synchronization signals broadcasted from the network cell.

42. The computer program product of claim 41, wherein the code for causing a computer to measure comprises:
code for causing a computer to determine loading of the network cell based at least in part on a loading indicator provided within a reference signal or a synchronization signal broadcasted from the network cell; and
code for causing a computer to estimate interference caused by the network cell as a function of loading of the network cell.

43. The computer program product of claim 41, wherein the code for causing a computer to measure comprises code for causing a computer to measure an amount of received power corresponding to a network cell based on at least one of reference signaling, a primary synchronization signal (PSS), a secondary synchronization signal (SSS), or Low Reuse Preamble (LRP) signaling communicated by the network cell.

44. A method performed by a network cell of a set of network cells operable to conduct communication using inter-site coordination with associated user equipment units, the method comprising:
defining an interference reporting schedule for one or more of the associated user equipment unit;
scheduling respective null pilot intervals within the interference reporting schedule;
conducting limited transmission upon occurrence of a scheduled null pilot interval within the interference reporting schedule;
receiving interference feedback from the one or more associated user equipment units subsequent to occurrence of a null pilot; and
selecting a coordination scheme to be utilized across the set of network cells for communication with at least one of the one or more associated user equipment units based at least in part on the received interference feedback.

45. The method of claim 44, wherein the conducting limited transmission comprises silencing transmission upon occurrence of a scheduled null pilot interval.

46. The method of claim 44, wherein the conducting limited transmission comprises reducing transmit power by a predefined power backoff value upon occurrence of a scheduled null pilot interval.

47. The method of claim 44, further comprising:
receiving one or more reports of observed channel quality from the one or more associated user equipment units; and
selecting the coordination scheme to be utilized across respective network cells for communication with the at least one of the one or more associated user equipment units based at least in part on the one or more received reports.

48. A wireless communications apparatus of a network cell, the network cell operable to conduct communication using inter-site coordination across a set of network cells with one or more associated user equipment units, comprising:
a memory that stores data relating to the one or more associated user equipment units and an interference reporting schedule associated with the one or more user equipment units; and
a processor configured to define one or more null pilot intervals within the interference reporting schedule such that limiting is performed for communication occurring substantially simultaneously with the respective null pilot intervals, receive interference feedback from the one or more user equipment units subsequent to occurrence of a null pilot, and select a coordination scheme to be utilized across the set of network cells for communication with at least one of the one or more associated user equipment units based at least in part on the received interference feedback.

49. The wireless communications apparatus of claim 48, wherein the processor is further configured to silence respective transmissions occurring substantially simultaneously with the respective null pilot intervals.

50. The wireless communications apparatus of claim 48, wherein the processor is further configured to reduce transmit power of respective transmissions occurring substantially simultaneously with the respective null pilot intervals.

51. The wireless communications apparatus of claim 48, wherein the processor is further configured to receive one or more reports of observed channel quality from the one or more associated user equipment units upon completion of a null pilot interval and to select the coordination scheme to be utilized between the wireless communications apparatus and the one or more cooperative network cells for communication with the at least one of the one or more associated user equipment units based at least in part on the received one or more reports.

52. An apparatus of a network cell, the network cell operable to conduct communication using inter-site coordination across a set of network cells with one or more associated user equipment units, comprising:
- means for defining an interference reporting schedule for the one or more associated user equipment units, wherein the interference reporting schedule includes one or more null pilots;
- means for performing at least one of transmit silencing or transmit power backoff upon occurrence of respective null pilots in the interference reporting schedule;
- means for receiving interference feedback from the one or more associated user equipment units subsequent to occurrence of a null pilot; and
- means for selecting a coordination scheme to be utilized across the set of network cells for communication with at least one of the one or more associated user equipment units based at least in part on the received interference feedback.

53. The apparatus of claim 52, further comprising:
- means for receiving one or more reports of observed channel quality from the one or more associated user equipment units; and
- means for selecting the coordination scheme to be utilized across the one or more network cells for communication with the at least one of the one or more associated user equipment units based at least in part on the received one or more reports.

54. A computer program product, comprising:
a non-transitory computer-readable medium, comprising:
- code for causing a computer of a network cell to define an interference reporting schedule for one or more associated user equipment units, wherein the interference reporting schedule includes one or more null pilots, the network cell operable to conduct communication using inter-site coordination across a set of network cells with the one or more associated user equipment units;
- code for causing a computer to conduct at least one of transmit silencing or transmit power backoff upon occurrence of respective null pilots in the interference reporting schedule;
- code for causing a computer to receive interference feedback from the one or more associated user equipment units subsequent to occurrence of a null pilot; and
- code for causing a computer to select a coordination scheme to be utilized across the set of network cells for communication with at least one of the one or more associated user equipment units based at least in part on the received interference feedback.

55. The computer program product of claim 54, wherein the computer-readable medium further comprises:
- code for causing a computer to receive one or more reports of observed channel quality from the one or more associated user equipment units; and
- code for causing a computer to select the coordination scheme to be utilized across the one or more network cells for communication with the at least one of the one or more associated user equipment units based at least in part on the received one or more reports.

* * * * *